(12) United States Patent
Yuuki et al.

(10) Patent No.: US 7,903,080 B2
(45) Date of Patent: Mar. 8, 2011

(54) LIQUID CRYSTAL DISPLAY INCLUDING A LIQUID CRYSTAL PANEL HAVING TWO SCREENS

(75) Inventors: Akimasa Yuuki, Chiyoda-ku (JP); Kyoichiro Oda, Chiyoda-ku (JP); Atsushi Ito, Chiyoda-ku (JP); Tetsuya Satake, Chiyoda-ku (JP); Shin Tahata, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 977 days.

(21) Appl. No.: 10/585,201

(22) PCT Filed: Feb. 9, 2005

(86) PCT No.: PCT/JP2005/001949
§ 371 (c)(1),
(2), (4) Date: Jul. 3, 2006

(87) PCT Pub. No.: WO2005/078514
PCT Pub. Date: Aug. 25, 2005

(65) Prior Publication Data
US 2008/0297431 A1 Dec. 4, 2008

(30) Foreign Application Priority Data
Feb. 13, 2004 (JP) .................................. 2004-037028

(51) Int. Cl.
*G09G 3/36* (2006.01)
(52) U.S. Cl. .......................................... 345/102; 345/1.1

(58) Field of Classification Search .................... 345/1.1, 345/1.3, 2.1, 2.2, 4, 3, 87–102; 349/61–64, 349/68, 96, 112, 113; 362/26, 27, 603, 611; 455/566, 575.3
See application file for complete search history.

(56) References Cited

U.S. PATENT DOCUMENTS

| | | | | |
|---|---|---|---|---|
| 5,115,228 A * | 5/1992 | Harris et al. | ........................ | 345/5 |
| 5,428,366 A * | 6/1995 | Eichenlaub | .................... | 345/102 |
| 5,856,819 A * | 1/1999 | Vossler | ........................ | 345/102 |
| 6,853,418 B2 * | 2/2005 | Suzuki et al. | .................. | 349/113 |
| 6,867,828 B2 * | 3/2005 | Taira et al. | ........................ | 349/65 |

(Continued)

FOREIGN PATENT DOCUMENTS
JP   62-35325   2/1987
(Continued)

OTHER PUBLICATIONS
U.S. Appl. No. 10/544,845, filed Mar. 30, 2006, Yuuki, et al.

*Primary Examiner* — Sumati Lefkowitz
*Assistant Examiner* — Rodney Amadiz
(74) *Attorney, Agent, or Firm* — Oblon, Spivak, McClelland, Maier & Neustadt, L.L.P.

(57) ABSTRACT

In a liquid crystal display, a pixel driving circuit 16 alternately displays a first image and a second image on a liquid crystal panel 11. A front light 12 lights up while the first image is displayed on the liquid crystal panel by the pixel driving circuit 16, and another front light 13 lights up while the second image is displayed on the liquid crystal panel by the pixel driving circuit 16. As a result, the liquid crystal display enables a viewer B to look at the second image different from the first image which it provides for a viewer A.

2 Claims, 17 Drawing Sheets

U.S. PATENT DOCUMENTS

| | | | |
|---|---|---|---|
| 6,986,598 B2 * | 1/2006 | Chu et al. | 362/561 |
| 7,002,649 B2 | 2/2006 | Yuuki et al. | |
| 7,515,131 B2 * | 4/2009 | Takeda | 345/87 |
| 2003/0063456 A1 * | 4/2003 | Katahira | 362/27 |
| 2004/0080924 A1 * | 4/2004 | Chuang | 362/27 |
| 2004/0183960 A1 * | 9/2004 | Kim et al. | 349/61 |
| 2004/0246412 A1 * | 12/2004 | Kim et al. | 349/113 |
| 2005/0046765 A1 * | 3/2005 | Liu | 349/61 |
| 2005/0046768 A1 * | 3/2005 | Wu | 349/65 |
| 2006/0007372 A1 | 1/2006 | Yuuki et al. | |

FOREIGN PATENT DOCUMENTS

| | | |
|---|---|---|
| JP | 2000-193956 | 7/2000 |
| JP | 2001-257754 | 9/2001 |
| JP | 2004-198886 | 7/2004 |
| JP | 2005-078070 | 3/2005 |
| WO | 2004/001491 | 12/2003 |

* cited by examiner (a)

(b)

| Film | | Phase Difference | Direction |
|---|---|---|---|
| CF's Side | Polarizing Plate | | 135° |
| | λ/4 Plate | 140nm | 0° |
| | c Plate | 220nm | |
| | a Plate | 110nm | 0° |
| Liquid Crystal | Alignment | | 90° |
| TFT's Side | c Plate | 220nm | |
| | λ/4 Plate | 140nm | 90° |
| | Polarizing Plate | | 45° |

| Film | | Phase Difference | Direction |
|---|---|---|---|
| CF's Side | Polarizing Plate | | 135° |
| | λ/2 Plate | 280nm | 150° |
| | λ/4 Plate | 140nm | 210° |
| | c Plate | 180nm | |
| | a Plate | 110nm | 0° |
| Liquid Crystal | Alignment | | 90° |
| TFT's Side | c Plate | 180nm | |
| | λ/4 Plate | 140nm | 120° |
| | λ/2 Plate | 280nm | 60° |
| | Polarizing Plate | | 45° |

| Film | | Phase Difference | Direction |
|---|---|---|---|
| CF's Side | Polarizing Plate | | 103° |
| | λ/2 Plate | 280nm | 166° |
| | λ/4 Plate | 100nm | 90° |
| Liquid Crystal | Alignment | | 90° |
| TFT's Side | λ/4 Plate | 100nm | 90° |
| | λ/2 Plate | 280nm | 22° |
| | Polarizing Plate | | 3° |

| Film | | Phase Difference | Direction |
|---|---|---|---|
| CF's Side | Polarizing Plate | | 112° |
| | λ/2 Plate | 320nm | 168° |
| | λ/4 Plate | 100nm | 90° |
| Liquid Crystal | Alignment | | 90° |
| TFT's Side | λ/4 Plate | 110nm | 90° |
| | λ/2 Plate | 240nm | 22° |
| | Polarizing Plate | | -2° |

# LIQUID CRYSTAL DISPLAY INCLUDING A LIQUID CRYSTAL PANEL HAVING TWO SCREENS

FIELD OF THE INVENTION

The present invention relates to a liquid crystal display which displays images on a liquid crystal panel having two screens, and information equipment, such as a mobile phone, a portable electronic notebook (PDA), or a wrist watch, which is equipped with the liquid crystal display.

BACKGROUND OF THE INVENTION

Conventionally, there have been provided reflective liquid crystal displays and semitransparent reflective liquid crystal displays. Any of such reflective liquid crystal displays and semitransparent reflective liquid crystal displays has only one screen.

Therefore, for example, when there is a request that screens are mounted on both an inside surface and an outside surface of a folding type mobile phone, respectively, there's no other choice but to mount two liquid crystal displays in the mobile phone.

This results in increase in the thickness of the display unit of the mobile phone and hence increase in the weight of the mobile phone. Furthermore, the mounting of two liquid crystal displays in the mobile phone increases the cost of the mobile phone.

Then, development of a liquid crystal display having two screens has been requested, and such a liquid crystal display has been provided.

For example, there has been provided a liquid crystal display in which a first reflective polarizer and a first absorptive polarizer are placed in the vicinity of one screen of a liquid crystal cell, and a second reflective polarizer and a second absorptive polarizer are placed in the vicinity of another screen of the liquid crystal cell.

In this liquid crystal display constructed as mentioned above, the same image is displayed on both the front screen and back screen of the liquid crystal cell (refer to, for example, patent reference 1).
[Patent reference 1] JP,2000-193956,A (see paragraphs [0026] to [0071], and FIG. 1)

A problem with the related art liquid crystal display constructed as mentioned above is that while it can display an image on both the screens, it cannot display another image different from the image currently being displayed on one screen on the other screen.

The present invention is made in order to solve the above-mentioned problem, and it is therefore an object of the present invention to provide a liquid crystal display which can display another image different from an image currently being displayed on one screen on the other screen.

It is another object of the present invention to provide information equipment equipped with a liquid crystal display which can display another image different from an image currently being displayed on one screen on the other screen.

DISCLOSURE OF THE INVENTION

In accordance with the present invention, there is provided a liquid crystal display including a pixel driving circuit for alternately displaying a first image and a second image on a liquid crystal panel, in which a first front light lights up while the first image is displayed on the liquid crystal panel by the pixel driving circuit, and a second front light lights up while the second image is displayed on the liquid crystal panel by the pixel driving circuit.

Therefore, the present invention offers an advantage of being able to display another image different from an image currently being displayed on one screen on the other screen.

PREFERRED EMBODIMENTS OF THE INVENTION

Hereafter, in order to explain this invention in greater detail, the preferred embodiments of the present invention will be described with reference to the accompanying drawings.

Embodiment 1

Figure 1:
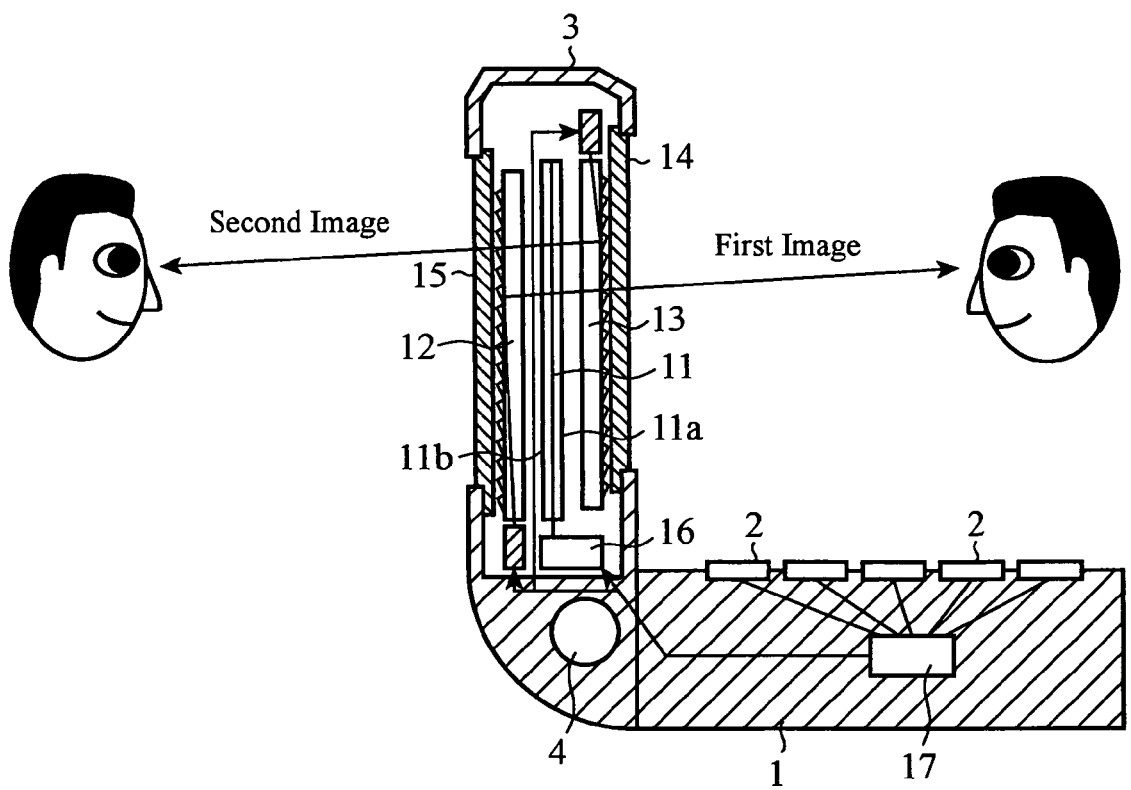
FIG. 1 is a cross-sectional view showing information equipment equipped with a liquid crystal display in accordance with embodiment 1 of the present invention.

FIG. 1 is a cross-sectional view showing information equipment equipped with a liquid crystal display in accordance with embodiment 1 of the present invention. Although the information equipment in accordance with this embodiment 1 is a mobile phone, the information equipment is not limited to a mobile phone. For example, the information equipment in accordance with this embodiment 1 can be a portable electronic notebook (PDA), a wrist watch, or the like.

In the figure, function switches 2, such as operation keys which enable the user to perform various kinds of operations, as well as ten keys which enable the user to input numbers, characters, and so on, are mounted in a main body 1 of the mobile phone.

A display unit 3 of the mobile phone is coupled to the main body 1 via a hinge 4 so that the display unit can be freely folded or unfolded, and the liquid crystal display is mounted in the display unit 3.

A liquid crystal panel 11 is provided with a liquid crystal cell having a plurality of pixels.

A front light 12 (or a first front light) is placed in the vicinity of a screen 11b of the liquid crystal panel 11, and lights up while a first image which a viewer A looks at is displayed on the liquid crystal panel 11. A front light 13 (or a second front light) is placed in the vicinity of another screen 11a of the liquid crystal panel 11, and lights up while a second image which a viewer B looks at is displayed on the liquid crystal panel 11.

A transparent cover 14 is disposed in an opening (or a window) formed in an inner surface of the display unit 3, and another transparent cover 15 is disposed in an opening (or a window) formed in an outer surface of the display unit 3.

When receiving image data from an image controller 17 of the mobile phone, a pixel driving circuit 16 applies the image data to each pixel of each of a plurality of gate lines of the liquid crystal panel 11 so as to display the image on the liquid crystal panel 11. When receiving image data about a first image and image data about a second image from the image controller 17, the pixel driving circuit 16 alternately displays the first and second images on the liquid crystal panel 11.

The image controller 17 outputs the image data according to, for example, an operation of the function switches 2, the transmission-and-reception status of a telephone call or an e-mail, and so on to the pixel driving circuit 16, and controls the switching on and off of each of the front lights 12 and 13.

Figure 2:
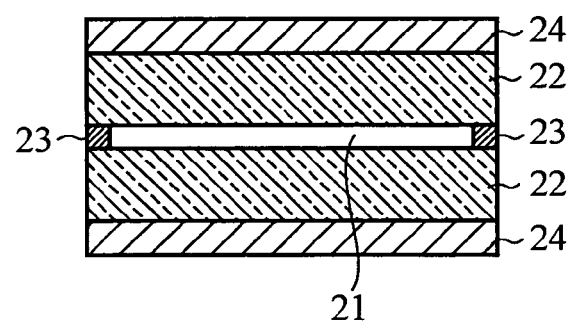
FIG. 2 is a cross-sectional view showing a liquid crystal panel of the liquid crystal display in accordance with embodiment 1 of the present invention.

FIG. 2 is a cross-sectional view showing the liquid crystal panel 11 of the liquid crystal display in accordance with embodiment 1 of the present invention. In the figure, the liquid crystal cell 21 has a plurality of pixels, and the liquid crystal cell 21 is sandwiched between a pair of transparent glass substrates 22. The perimeter of the liquid crystal cell 21 is sealed with sealing agents 23.

A pair of polarizing plates 24 are placed on the outer surfaces of the pair of transparent glass substrates 22, respectively, and polarize light emitted out of each pixel of the liquid crystal cell 21.

Next, the operation of the information equipment in accordance with this embodiment of the present invention will be explained.

In a state where the display unit 3 of the mobile phone is unfolded, a viewer A can observe the screen 11a of the liquid crystal panel 11 through the transparent cover 14, while another viewer B can observe the screen 11b of the liquid crystal panel 11 through the transparent cover 15, as shown in FIG. 1.

The image controller 17 of the mobile phone outputs image data according to, for example, an operation of the function switches 2, the transmission-and-reception status of a telephone call or an e-mail, and so on to the pixel driving circuit 16. For example, when a user operates the mobile phone so as to enable the viewer A to look at the first image and enable the viewer B to look at the second image, or a user operates the mobile phone so as to prevent the viewer B from looking at an image which the viewer A is looking at, the image controller 17 outputs the image data about the first image and the image data about the second image to the pixel driving circuit 16, and also outputs an image control signal for instructing an alternate display of the first and second images to the pixel driving circuit 16.

The image controller 17 outputs a light control signal for controlling the switching on and off of each of the front lights 12 and 13 to each of the front lights 12 and 13.

While receiving the image data about the first image and the image data about the second image from the image controller 17 of the mobile phone, and also receiving the image control signal from the image controller 17, the pixel driving circuit 16 displays the first image on the liquid crystal panel 11 by applying the image data about the first image to each pixel of each of the plurality of gate lines 1 to N of the liquid crystal panel 11.

At this time, the front light 12 is made to light up according to the light control signal outputted from the image controller 17 while the first image is displayed on the liquid crystal panel 11.

As a result, the viewer A can look at the first image currently being displayed on the screen 11a of the liquid crystal panel 11 through the transparent cover 14.

On the other hand, since the front light 13 is switched off, the viewer B cannot look at the first image currently being displayed on the screen 11b of the liquid crystal panel 11 through the transparent cover 15.

Figure 3:
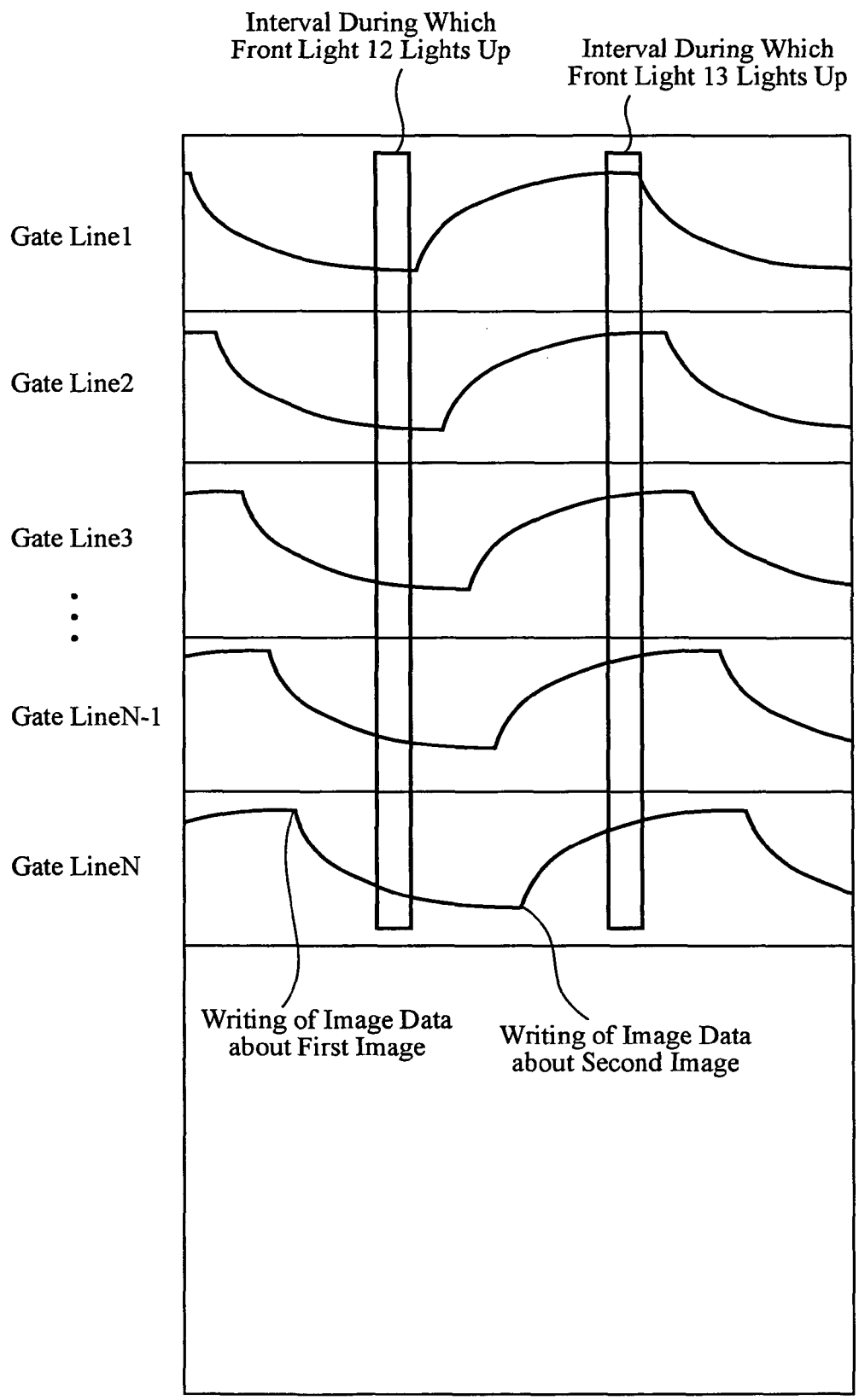
FIG. 3 is an explanatory diagram showing a timing at which a first image and a second image are alternately written.

FIG. 3 is an explanatory diagram showing a timing at which the first and second images are alternately written. In the figure, the horizontal axis shows time, and the vertical axis shows the transmissivity of each pixel of each of the plurality of gate lines 1 to N.

As can be seen from FIG. 3, the pixel driving circuit 16 applies the image data about the first image to the plurality of gate lines 1 to N of the liquid crystal panel 11 in turn when displaying the first image on the liquid crystal panel 11. Since the front light 12 lights up simultaneously over the entire screen after the image data has been applied to all the gate lines 1 to N in turn, the first image is simultaneously displayed on the entire screen 11a of the liquid crystal panel 11.

After displaying the first image on the liquid crystal panel 11 in the above-mentioned way, the pixel driving circuit 16 displays the second image on the liquid crystal panel 11 by applying the image data about the second image to each pixel of each of the plurality of gate lines 1 to N of the liquid crystal panel 11 after the front light 12 is switched off according to the light control signal.

At this time, the front light 13 is made to light up according to the light control signal outputted from the image controller 17 while the second image is displayed on the liquid crystal panel 11.

As a result, the viewer B can look at the second image currently being displayed on the screen 11b of the liquid crystal panel 11 through the transparent cover 15.

On the other hand, since the front light 12 is switched off, the viewer A cannot look at the second image currently being displayed on the screen 11a of the liquid crystal panel 11 through the transparent cover 14.

As can be seen from FIG. 3, the pixel driving circuit 16 applies the image data about the second image to the plurality of gate lines 1 to N of the liquid crystal panel 11 in turn when displaying the second image on the liquid crystal panel 11. Since the front light 13 lights up simultaneously over the entire screen after the image data has been applied to all the gate lines 1 to N in turn, the second image is simultaneously displayed on the entire screen 11b of the liquid crystal panel 11.

After that, the pixel driving circuit 16 alternately displays the first and second images on the liquid crystal panel 11 in the above-mentioned way, and the front lights 12 and 13 are made to alternately light up.

In this case, when the pixel driving circuit 16 makes the frequency of the alternately writing of the first and second images into the plurality of gate lines match with the frequency of the alternately switching on of the front lights 12 and 13 so that they are equal to a frequency of 60 Hz or more (i.e., 120 Hz or more in all), the viewer A can look at the first image which blinks at the frequency of 60 Hz or more while the viewer B can look at the second image which blinks at the frequency of 60 Hz or more.

It is to be noted that human beings cannot recognize any blink with a frequency of 60 Hz or more as blink, but recognizes it as an image being displayed continuously.

As can be seen from the above description, in accordance with this embodiment 1, the pixel driving circuit 16 alternately displays a first image and a second image on the liquid crystal panel 11, and the front light 12 is made to light up while the first image is displayed on the liquid crystal panel by the pixel driving circuit 16 and the front light 13 is made to light up while the second image is displayed on the liquid crystal panel by the pixel driving circuit 16. Therefore, the present embodiment offers an advantage of being able to enable a viewer A to look at the first image and to enable a viewer B to look at the second image different from the first image.

Therefore, the information equipment is effective especially for a case where there is a necessity to prevent the viewer B from looking at the image which the viewer A is looking at. Furthermore, the information equipment makes it possible to precisely provide characters or the like for the viewers A and B, respectively.

Furthermore, in accordance with this embodiment 1, when displaying the first or second image on the liquid crystal panel 11, the pixel driving circuit 16 applies the image data about the image to be displayed on the liquid crystal panel 11 to the plurality of gate lines 1 to N of the liquid crystal panel in turn, and the front light 12 or 13 is made to light up after the image data has been applied to all the gate lines 1 to N in turn. Therefore, the present embodiment offers another advantage of being able to display the image simultaneously over the entire screen of the liquid crystal panel 11.

In addition, in accordance with this embodiment 1, the liquid crystal panel 11 is provided with the liquid crystal cell 21 having a plurality of pixels, the pair of transparent glass substrates 22 which sandwich the liquid crystal cell 21, and the pair of polarizing plates 24 placed outside the pair of transparent glass substrates 22. Therefore, the present embodiment offers a further advantage of being able to provide the liquid crystal panel 11 having the screens 11a and 11b.

Embodiment 2

In above-mentioned embodiment 1, each of the front lights 12 and 13 is provided with a single light source, and, when the single light source lights up, each of the front lights 12 and 13 simultaneously lights up over the entire screen of the liquid crystal panel 11. As an alternative, each of the front lights 12 and 13 can be provided with a plurality of light sources. In this case, the plurality of light sources can be made to light up in order that they are arranged from an upper part of the screen to a lower part of the screen in synchronization with writing of the image to the plurality of gate lines of the liquid crystal panel 11 which respectively correspond to parts of the screen starting from the upper part of the screen and ending at the lower part of the screen.

To be more specific, a liquid crystal display in accordance with this embodiment operates as follows.

Figure 4:
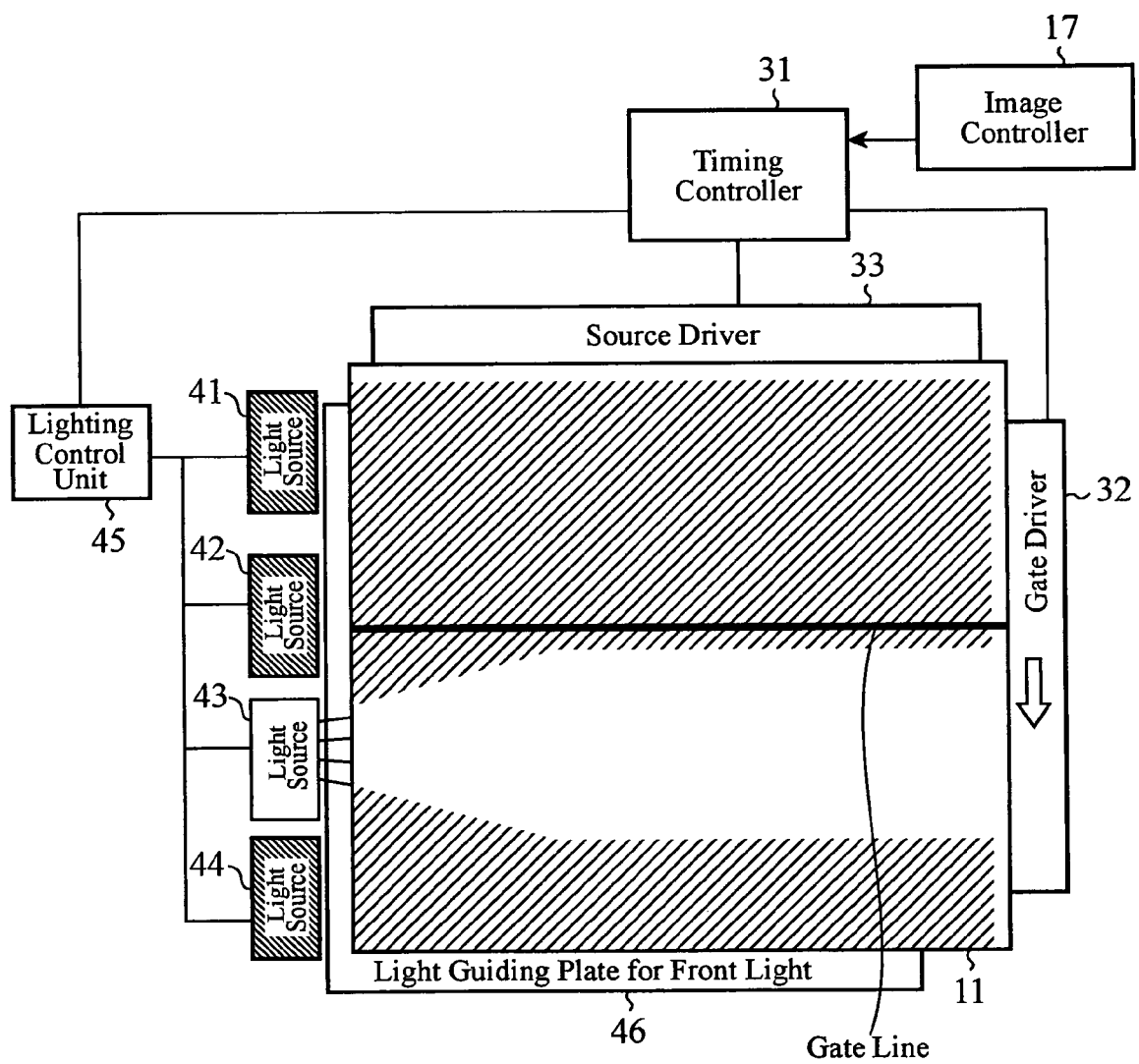
FIG. 4 is a block diagram showing a part of information equipment equipped with a liquid crystal display in accordance with embodiment 2 of the present invention.

FIG. 4 is a block diagram showing a part of information equipment equipped with the liquid crystal display in accordance with embodiment 2 of the present invention. In the figure, since the same reference numerals as shown in FIG. 1 denote the same components or like components, the explanation of the components will be omitted hereafter.

A timing controller 31, a gate driver 32, and a source driver 33 constitute a pixel driving circuit of this embodiment which corresponds to the pixel driving circuit 16 of FIG. 1.

When receiving image data about a first image and image data about a second image from an image controller 17, the timing controller 31 outputs the image data about the first or second image to the source driver 33 according to an image control signal outputted from the image controller 17, and also outputs a synchronizing signal outputted from the image controller 17 to the gate driver 32 and source driver 33. The timing controller 31 further outputs a light control signal outputted from the image controller 17 to a lighting control unit 45.

The gate driver 32 selects a gate line to which the source driver 33 can output the image data on the basis of the synchronizing signal outputted from the image controller 17 one by one from the plurality of gate lines.

The source driver 33 operates on the basis of the synchronizing signal outputted from the image controller 17 so as to apply the image data to each pixel of the gate line selected by the gate driver 32.

The plurality of light sources 41 to 44, lighting control unit 45, and a light guiding plate for front light 46 constitute a front light which corresponds to each of the front lights 12 and 13 of FIG. 1.

When receiving the light control signal from the timing controller 31, the lighting control unit 45 makes the plurality of light sources 41 to 44 light up in turn.

Figure 5:
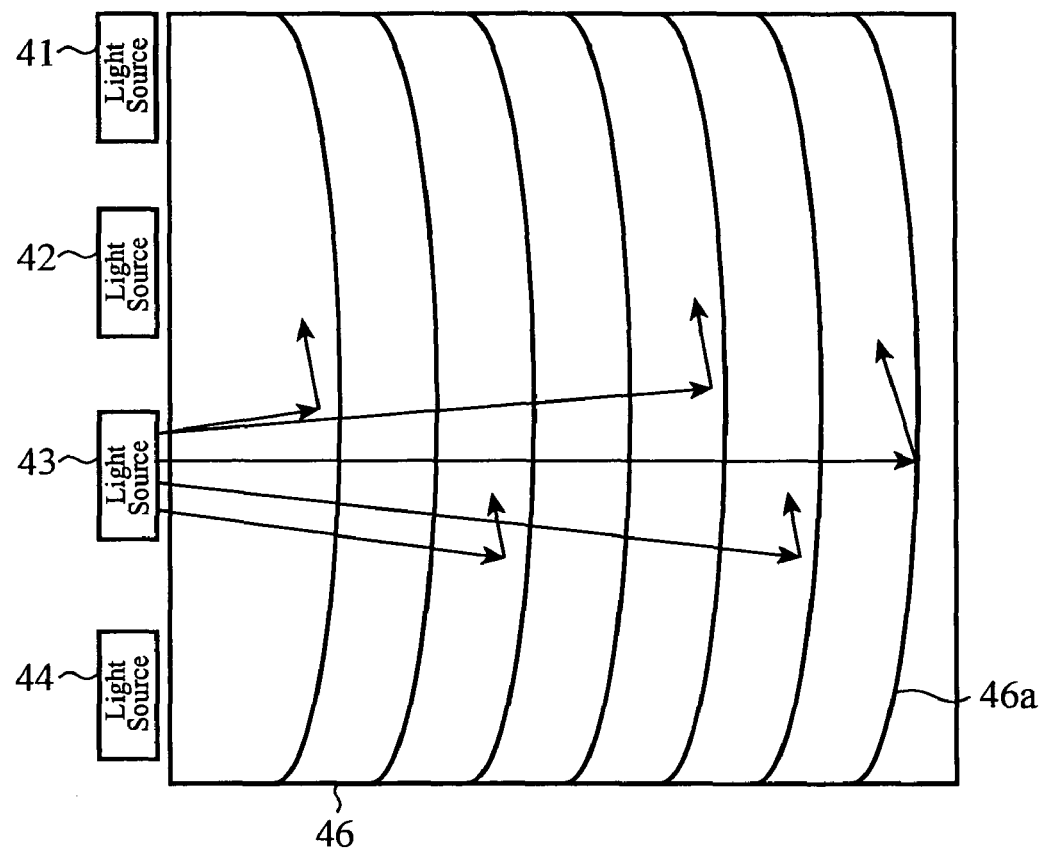
FIG. 5(a) is an explanatory diagram showing a light guiding plate for front light 46.
FIG. 5(b) is a side view showing the light guiding plate for front light 46.
Figure 5:
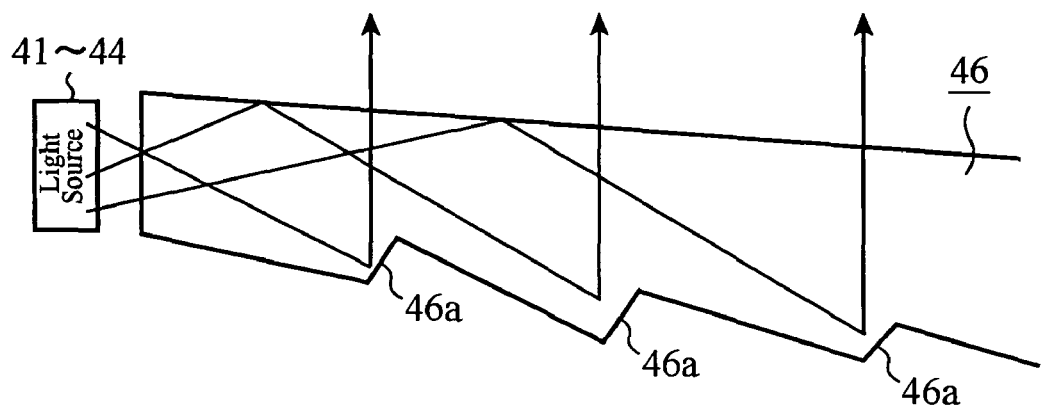

The light guiding plate for front light 46 has an array of reflecting prisms 46a each of which reflects light emitted out of each of the plurality of light sources 41 to 44, as shown in FIG. 5, and each reflecting prism 46a is extending in a direction parallel to the direction in which the plurality of light sources 41 to 44 are aligned.

FIG. 5(a) is an explanatory diagram showing the light guiding plate for front light 46, and FIG. 5(b) is a side view showing the light guiding plate for front light 46.

Next, the operation of the information equipment in accordance with this embodiment of the present invention will be explained.

For example, when a user operates the mobile phone so as to provide an instruction for enabling a viewer A to look at a first image and enabling a viewer B to look at a second image to the image controller 17 of the mobile phone, as in the case of above-mentioned embodiment 1, the image controller 17 outputs the image data about the first image and the image data about the second image to the timing controller 31 of the pixel driving circuit 16, and also outputs an image control signal for instructing an alternate display of the first and second images to the timing controller 31.

The image controller 17 also outputs a light control signal for controlling the switching on and off of each of the front lights 12 and 13 to the timing controller 31.

When receiving the image data about the first image and the image data about the second image from the image controller 17, the timing controller 31 of the pixel driving circuit 16 outputs the image data about the first or second image to the source driver 33 according to the image control signal outputted from the image controller 17.

In other words, the timing controller 31 alternately outputs the image data about the first image and the image data about the second image to the source driver 33 according to the image control signal outputted from the image controller 17.

The timing controller 31 further outputs a synchronizing signal outputted from the image controller 17 to both the gate driver 32 and source driver 33 and also outputs the light control signal outputted from the image controller 17 to the lighting control unit 45.

The gate driver 32 of the pixel driving circuit 16 selects a gate line to which the source driver 33 can output the image data from the plurality of gate lines one by one according to the synchronizing signal outputted from the image controller 17.

In other words, the gate driver 32 operates on the basis of the synchronizing signal outputted from the image controller 17 so as to select a gate line to which the source driver 33 can output the image data from the plurality of gate lines one by one in the order of the gate line 1→the gate line 2-→the gate line 3→. . . →the gate line N−1→the gate line N.

When receiving the image data about the first image from the timing controller 31, the source driver 33 of the pixel driving circuit 16 operates on the basis of the synchronizing signal outputted from the image controller 17 so as to display the first image on the liquid crystal panel 11 by applying the image data about the first image to each pixel of the gate line selected by the gate driver 32.

In other words, the source driver 33 operates on the basis of the synchronizing signal outputted from the image controller 17 to display the first image on the liquid crystal panel 11 by applying the image data about the first image to each pixel of the gate line which is selected from the plurality of gate lines one by one in the order of the gate line 1→the gate line 2→the gate line 3→. . . →the gate line N−1→the gate line N.

At this time, when receiving the light control signal from the timing controller 31, the lighting control unit 45 of the front light 12 makes the plurality of light sources 41 to 44 light up in turn while the first image is displayed on the liquid crystal panel 11.

As a result, since the light guiding plate for front light 46 of the front light 12 reflects light emitted out of each of the plurality of light sources 41 to 44 toward the liquid crystal panel 11, the viewer A can look at the first image currently being displayed on the screen 11a of the liquid crystal panel 11 through the transparent cover 14.

In other words, as shown in FIG. 4, since the light emitted out of each of the plurality of light sources 41 to 44 travels through the light guiding plate for front light 46 in a direction which is substantially parallel to the plurality of gate lines, an illuminated region which is parallel to the plurality of gate lines appears. Therefore, the entire screen can be illuminated in a state where a delay between the writing of the image data into the panel and the switching on of each light source is nearly equal.

Since the plurality of light sources 41 to 44 of the front light 13 are all switched off, the viewer B cannot look at the first image currently being displayed on the screen 11b of the liquid crystal panel 11 through the transparent cover 15.

Figure 6:
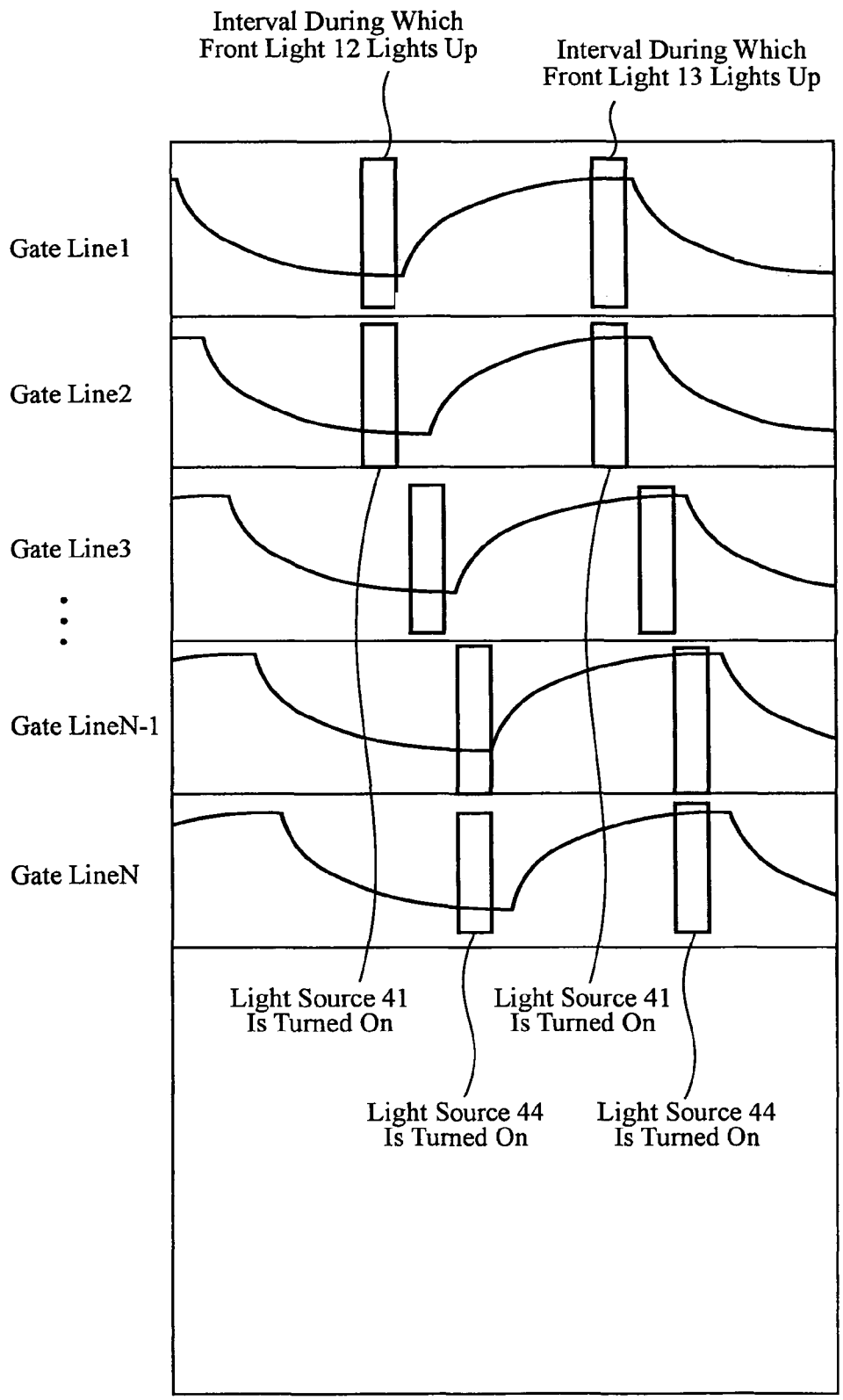
FIG. 6 is an explanatory diagram showing a timing at which a first image and a second image are alternately written.

FIG. 6 is an explanatory diagram showing a timing at which the first and second images are alternately written. In the figure, the horizontal axis shows time and the vertical axis shows the transmissivity of each pixel of each of the plurality of gate lines 1 to N.

As can be seen from FIG. 6, the source driver applies the image data about the first image to the plurality of gate lines 1 to N of the liquid crystal panel 11 in turn when displaying the first image on the liquid crystal panel 11. Since the plurality of light sources are switched on in order that they correspond to the plurality of gate lines to which the image data is sequentially applied, respectively, that is, since they are switched on in order of the light source 41→the light source 42→the light source 43→the light source 44, the time which elapses until the front light lights up since the image data has been applied to each pixel of each of the plurality of gate lines 1 to N is nearly equal. Therefore, the front light is switched on in a state where each pixel of the plurality of gate lines 1 to N is stabilized, and the brightness unevenness in the entire screen of the liquid crystal panel 11 can be improved. Therefore, the entire screen of the liquid crystal panel can provide bright and stable gradations.

After the first image is displayed on the liquid crystal panel 11 as mentioned above, the gate driver 32 of the pixel the driving circuit 16 selects a gate line to which the source driver 33 can output the image data from the plurality of gate lines one by one according to the synchronizing signal outputted from the image controller 17 after the lighting control unit 45 of the front light 12 switches off the light source 41 according to the light control signal.

In other words, the gate driver 32 operates on the basis of the synchronizing signal outputted from the image controller 17 so as to select a gate line to which the source driver 33 can output the image data from the plurality of gate lines one by one in the order of the gate line 1→the gate line 2-> the gate line 3→. . . →the gate line N−1→the gate line N.

When receiving the image data about the second image from the timing controller 31, the source driver 33 of the pixel driving circuit 16 operates on the basis of the synchronizing signal outputted from the image controller 17 so as to display the second image on the liquid crystal panel 11 by applying the image data about the second image to each pixel of the gate line selected by the gate driver 32.

In other words, the source driver 33 operates on the basis of the synchronizing signal outputted from the image controller 17 to display the second image on the liquid crystal panel 11 by applying the image data about the second image to each pixel of the gate line which is selected from the plurality of gate lines one by one in the order of the gate line 1→the gate line 2→the gate line 3→. . . →the gate line N−1→the gate line N.

At this time, when receiving the light control signal from the timing controller 31, the lighting control unit 45 of the front light 13 makes the plurality of light sources 41 to 44 of the front light 13 light up in turn while the second image is displayed on the liquid crystal panel 11.

As a result, since the light guiding plate for front light 46 of the front light 13 reflects light emitted out of each of the plurality of light sources 41 to 44 toward the liquid crystal panel 11, the viewer B can look at the second image currently being displayed on the screen 11b of the liquid crystal panel 11 through the transparent cover 15.

In this case, since the plurality of light sources 41 to 44 of the front light 12 are not switched on while the second image is displayed at an overlapped position, the viewer A cannot look at the second image currently being displayed on the screen 11a of the liquid crystal panel 11 through the transparent cover 14.

As can be seen from FIG. 6, the source driver applies the image data about the second image to the plurality of gate lines 1 to N of the liquid crystal panel 11 in turn when displaying the second image on the liquid crystal panel 11. Since the plurality of light sources are switched on in order that they correspond to the plurality of gate lines to which the image data is sequentially applied, respectively, that is, since they are switched on in the order of the light source 41→the light source 42→the light source 43→the light source 44, the time which elapses until the front light lights up since the image data has been applied to each pixel of each of the plurality of gate lines 1 to N is nearly equal. Therefore, the front light is switched on in a state where each pixel of the plurality of gate lines 1 to N is stabilized, and the brightness unevenness in the entire screen of the liquid crystal panel 11 can be improved. Therefore, the entire screen of the liquid crystal panel can provide bright and stable gradations.

After that, the pixel driving circuit 16 alternately displays the first and second images on the liquid crystal panel 11 in the above-mentioned way, and the front lights 12 and 13 are made to alternately light up.

In this case, when the pixel driving circuit 16 makes the frequency of the alternately writing of the first and second images into the plurality of gate lines match with the frequency of the alternately switching on of the front lights 12 and 13 so that they are equal to a frequency of 60 Hz or more, as in the case of above-mentioned embodiment 1, the viewer A can look at the first image which blinks at the frequency of 60 Hz or more while the viewer B can look at the second image which blinks at the frequency of 60 Hz or more.

Figure 7:
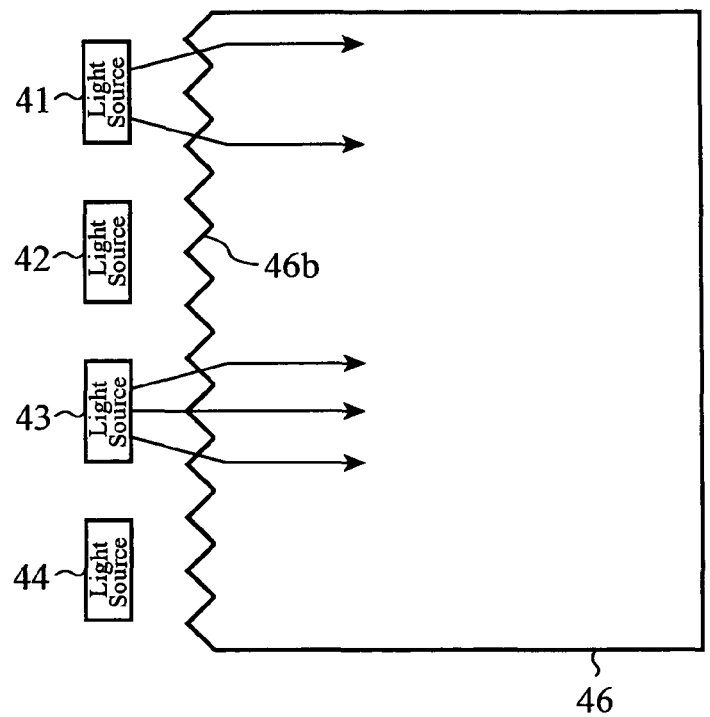
FIG. 7 is an explanatory diagram showing the light guiding plate for front light.
Figure 8:
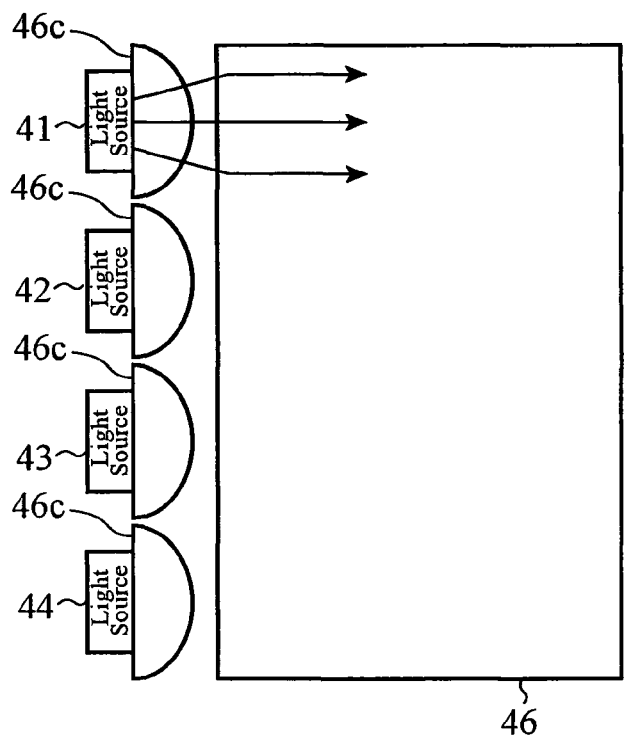
FIG. 8 is an explanatory diagram showing the light guiding plate for front light.

In this embodiment 2, the light guiding plate for front light 46 has the array of reflecting prisms 46a each of which reflects light emitted out of each of the plurality of light sources 41 to 44, as previously mentioned. As an alternative, the light guiding plate for front light 46 can have a sawtooth-shaped prism 46b or a lens 6c which is added to each of the plurality of light sources 41 to 44, as shown in FIGS. 7 and 8, so that the prism 46b or lens 46c can make rays of light emitted out of each of the plurality of light sources 41 to 44 travel in a nearly-parallel direction within the light guiding plate for front light 46.

In this embodiment, the writing of image data into the LCD panel is performed for every gate line, as previously mentioned. However, the writing of image data into the LCD panel is not limited to this example. In a case where the writing of image data into the LCD panel is performed for every pixel, the same action as mentioned above can be implemented if the writing of image data into the LCD panel for each pixel is performed in a direction parallel to boundaries between the illuminated regions in which each front light lights up.

Furthermore, although each pixel of the liquid crystal panel has sub pixels having color filters of different colors, it is desirable that the color filters are aligned in a direction perpendicular to the reflecting prism 46a in order to suppress occurrence of moire fringes with each front light.

Embodiment 3

In above-mentioned embodiments 1 and 2, the pixel driving circuit 16 alternately displays first and second images on the liquid crystal panel 11, and the front light 12 is made to light up while the first image is displayed on the liquid crystal panel by the pixel driving circuit 16 and the front light 13 is made to light up while the second image is displayed on the liquid crystal panel by the pixel driving circuit 16, as previously mentioned. When the liquid crystal display is constructed of the liquid crystal panel 11 of FIG. 2, the second image may be mixed into the first image and displayed on the screen 11a of the liquid crystal panel 11, or the first image may be mixed into the second image and displayed on the screen 11b of the liquid crystal panel 11 because of a response delay.

This embodiment 3 is aimed at eliminating the response delay so as to remove the mixture of the first or second image into the other image.

Figure 9:
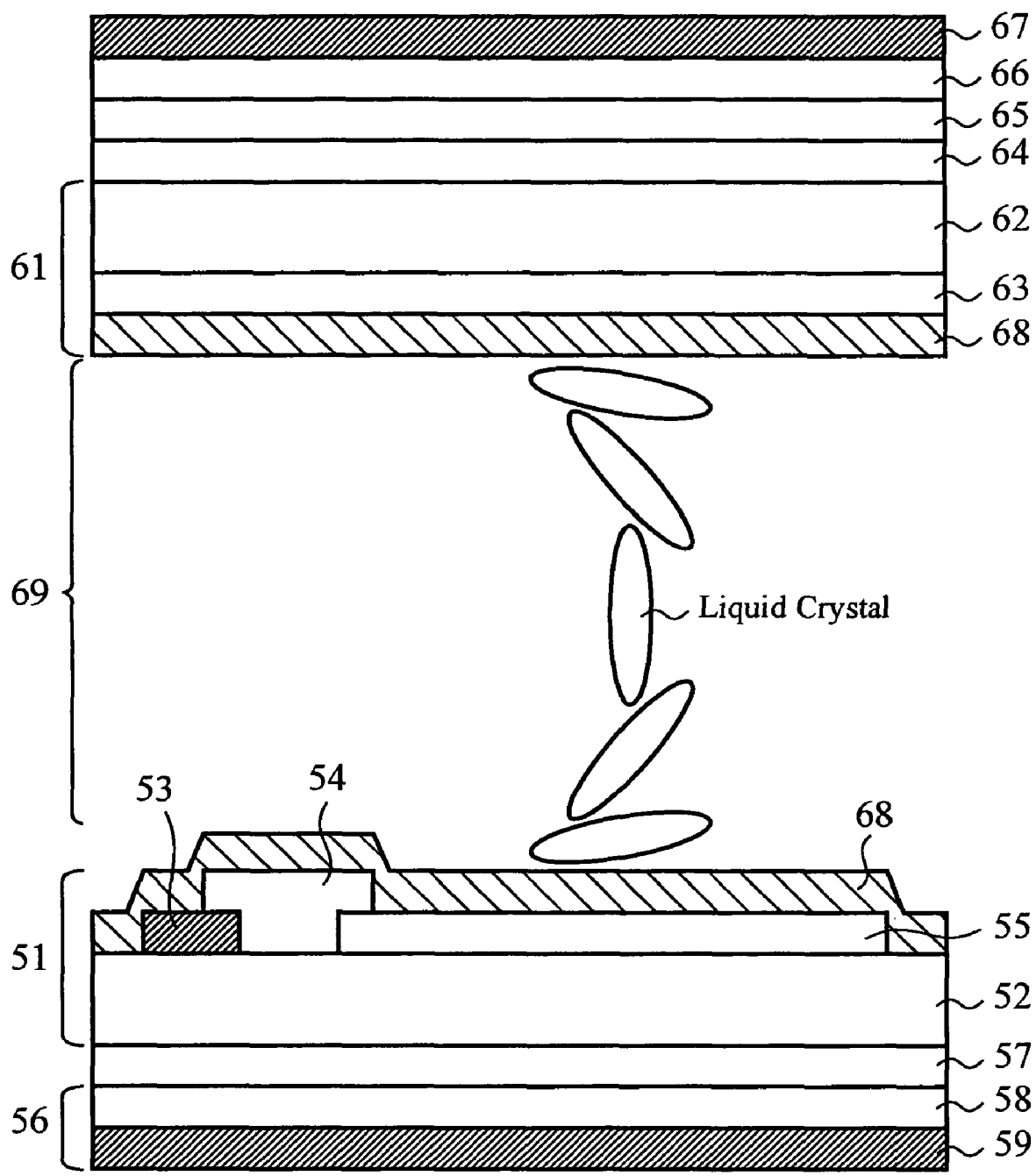
FIG. 9 is a cross-sectional view showing a liquid crystal panel 11 of a liquid crystal display in accordance with embodiment 3 of the present invention.

FIG. 9 is a cross-sectional view showing a liquid crystal panel 11 of a liquid crystal display in accordance with embodiment 3 of the present invention. In the figure, a TFT (Thin Film Transistor) substrate 51 is provided with a glass substrate 52, a signal wire 53 made of a metallic film (e.g., Mo or Cr), such as a gate or source, a TFT unit 54 which serves as a switch, and a picture element electrode 55 made of a transparent material, such as ITO (Indium Tin Oxide).

A negative c plate 57 is disposed on an outer surface of the TFT substrate 51. A circular polarizing plate 56 is disposed on an outer surface of the c plate 57, and is provided with a λ/4 plate 58 and a polarizing plate 59.

A CF substrate 61 is provided with a glass substrate 62, and a counterelectrode 63 which consists of color filters of different colors: R, G, and B, and a transparent material, such as ITO.

A plate 64, a c plate 65, a λ/4 plate 66, and a polarizing plate 67 are disposed on an outer surface of the CF substrate 61.

An alignment film 68, such as polyimide, is formed in an inner surface of each of the TFT substrate 51 and CF substrate 61, and the both substrates are boded together with a sealant (not shown) applied to the perimeters of both the substrates.

A liquid crystal layer 69 with a bend alignment is poured into between the TFT substrate 51 and the CF substrate 61. The bend alignment means that a group of liquid crystal elements inserted between the TFT substrate 51 and the CF substrate 61 are placed in an alignment state in which they look as if they are bent in the vicinity of the center of the liquid crystal layer 69.

Since the liquid crystal panel 11 of FIG. 9 is provided with the liquid crystal layer 69 with a bend alignment, it has a characteristic of quickly responding a change of a voltage applied thereto.

The liquid crystal panel provided with the liquid crystal layer 69 with a bend alignment is disclosed by the following reference: T. Miyashita, et al., Eurodisplay '93, p. 149, and the response characteristic of the bend alignment is disclosed by the following reference: S. Onda, et al., Mol. Cryst. Liq. Cryst. 1999, Vol. 331, p. 383, for example.

In accordance with this embodiment 3, the liquid crystal layer 69 is made of a liquid crystal material having birefringence anisotropy Δn of 0.18 (at 589 nm and 25 degrees centigrade), and permittivity anisotropy Δε of +8 (at 1 kHz and 25 degrees centigrade), and has a thickness (or cell gap) of 5.0 microns.

Next, the film structure of the liquid crystal panel 11 will be explained.

As shown in FIG. 9, the negative c plate 57, λ/4 plate 58, and polarizing plate 59 are disposed on the outer surface of the TFT substrate 51.

The negative c plate 57 has an in-plane phase difference of about 0 nm, and is a phase difference film having a negative phase difference in the direction of the thickness thereof.

The λ/4 plate 58 is a type of plate having a phase difference in a film plane, and has an in-plane phase difference of about λ/4, where λ is a wavelength of about 550 nm which provides high visibility for human beings' eyes.

The polarizing plate 59 allows only light linearly polarized in a certain direction to pass therethrough and absorbs light linearly polarized in a direction perpendicular to the certain direction.

On the other hand, the a plate 64, negative c plate 65, λ/4 plate 66, and polarizing plate 67 are disposed on the outer surface of the CF substrate 61.

The a plate 64 has an in-plane phase difference which is set to be the same as the residual phase difference of the liquid crystal layer 69 when a voltage for black display is applied to each pixel, as will be mentioned below.

Figures 10, 11:
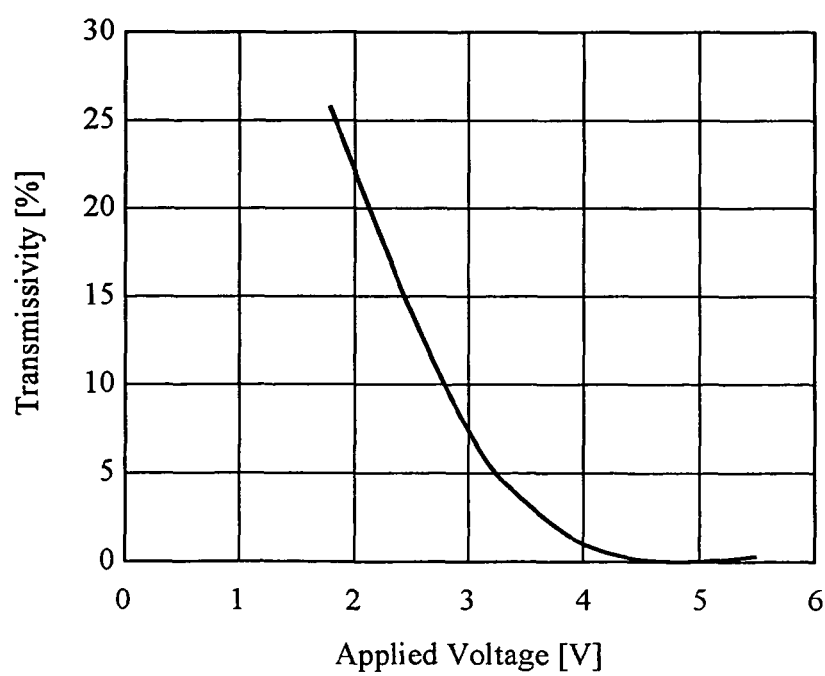
FIG. 10 is an explanatory diagram showing the details of the specifications of optical films of the liquid crystal panel 11 of FIG. 9.
FIG. 11 is an explanatory diagram showing the voltage-transmissivity characteristics of the liquid crystal panel 11 of FIG. 9.

FIG. 10 is an explanatory diagram showing the details of the specifications of the optical films of the liquid crystal panel 11 of FIG. 9.

The column of "phase difference" shows the in-plane phase difference in the case of the a plate (including the λ/4 plate), and shows the phase difference in the thickness direction in the case of the c plate. They are both phase difference values measured at the wavelength of 550 nm.

The column of "direction" shows the direction of the transmission axis in the case of the polarizing plate, shows the direction of the in-plane slow axis in the case of the phase difference film, and shows the direction of the alignment in the case of the liquid crystal layer. Each of the directions is defined so that it is measured in degrees with respect to (0 degrees) a rightward direction (i.e., a direction of 3:00) when the front of the liquid crystal panel 11 is viewed from the observer A's side thereof, and it has a positive value when measured in a counterclockwise direction. All the phase difference films used in this embodiment 3 are Arton films.

Light which is incident upon the liquid crystal panel 11 at a right angle from the TFT substrate 51's side of the liquid crystal panel 11 becomes linearly polarized light after passing through the polarizing plate 59, and then becomes circularly-polarized light after passing through the λ/4 plate 58.

When the polarizing plate 59 and λ/4 plate 5 are arranged so that the absorption axis of the polarizing plate 59 forms an angle of 45 degrees with the slow axis of the λ/4 plate 58, these optical films serve as a circularly polarizing plate.

Since the c plate 57 does not have any in-plane phase difference, it does not have a function of changing the polarization of light incident thereupon when the light is vertically incident thereupon.

Although the combination of the polarizing plate 67 and λ/4 plate 66 is also disposed on the CF substrate 61 of the liquid crystal panel, the whole of the optical films disposed on the CF substrate 61 does not serve as a circularly polarizing plate since the a plate 64 is placed on the CF substrate 61 so that it gets closer to the liquid crystal layer 69 than the polarizing plate 67 and λ/4 plate 66.

The liquid crystal panel 11 of FIG. 9 is placed in normally white mode in which it produces a black display when a high voltage is applied thereto, and it produces a white display when a low voltage is applied thereto.

In the liquid crystal layer 69 with a bend alignment, since liquid crystal molecules in the vicinity of the interfaces between the liquid crystal layer 69 and both the TFT substrate 51 and the CF substrate 61 do not rise completely even though a high voltage is applied to the liquid crystal layer 69, a phase difference remains in plane.

In order to compensate for this residual phase difference, the a plate 64 having the same phase difference is disposed. The a plate 64 is placed so that the direction of the slow axis of the a plate 64 is perpendicular to the direction of the liquid crystal alignment.

In this embodiment 3, the low voltage for white display is set to 2.0V, and the high voltage for black display is set to 5.0V. The in-plane phase difference of the a plate 64 is set to 110 nm which is the same as the residual phase difference of the liquid crystal layer 69 when 5.0V is applied to the liquid crystal layer.

FIG. 11 is an explanatory diagram showing the voltage-transmissivity characteristics of the liquid crystal panel 11 of FIG. 9.

The transmissivity is measured with respect to the intensity of light passing-through the liquid crystal panel in which no optical films are arranged.

Figure 12:
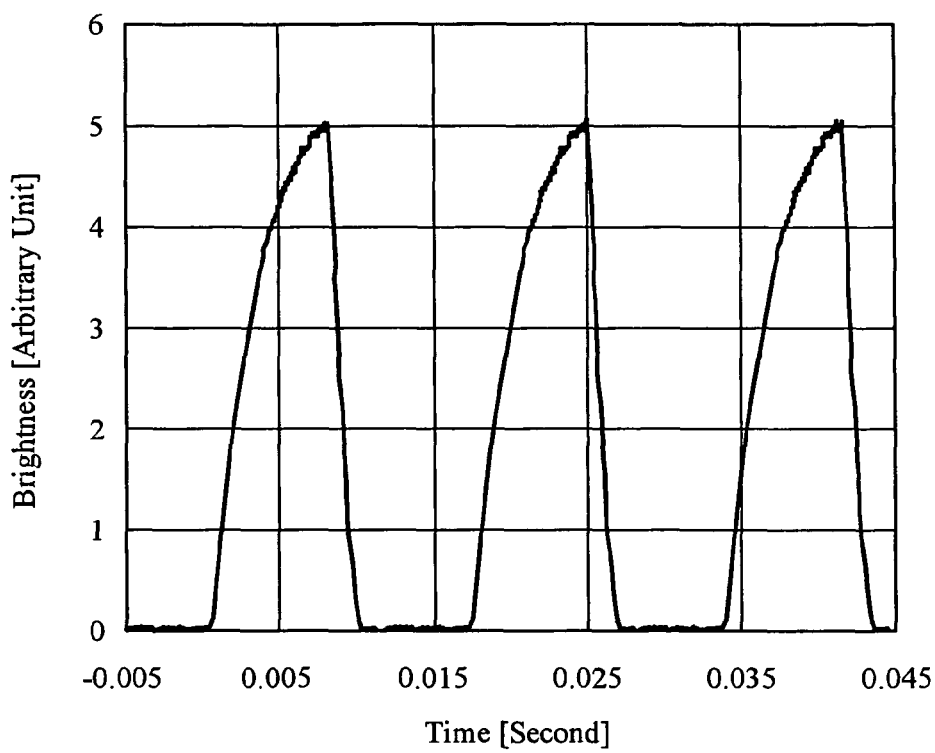
FIG. 12 is an explanatory diagram showing the optical response characteristics of each pixel of the liquid crystal panel when driven at a frequency of 120 Hz.

FIG. 12 is an explanatory diagram showing the optical response characteristics of each pixel of the liquid crystal panel when driven at a frequency of 120 Hz.

In either of a case where white and black displays are alternately produced and switching from the black display to the white display is done, or a case where white and black images are alternately produced and switching from the while display to the black display is done, a response time of less than several milliseconds is realized.

Figure 13:
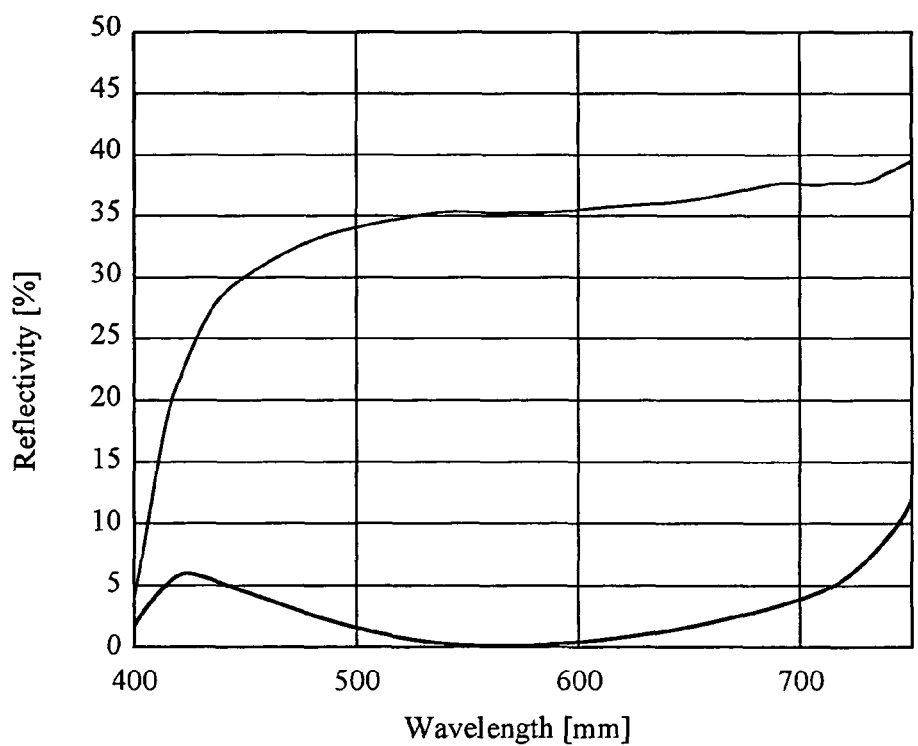
FIG. 13 is an explanatory diagram showing reflection spectra of a circularly polarizing plate of the liquid crystal panel 11 of FIG. 9.

FIG. 13 is an explanatory diagram showing reflection spectra of the circularly polarizing plate of the liquid crystal panel 11 of FIG. 9. In the figure, a thick line shows a reflection spectrum in a case where all the optical films disposed on the TFT substrate 51 of this embodiment 3 are bonded to a glass substrate onto which an aluminum metallic film is vapor-deposited.

The reflectivity of the circularly polarizing plate is measured with respect to the reflectivity of a glass substrate with aluminum having no film. Compared with the reflectivity (shown by a thin line in the figure) of only a polarizing plate, the reflectivity of the circularly polarizing plate of this embodiment is reduced particularly at the wavelength of about 560 nm.

When the liquid crystal panel of FIG. 9 is placed so that its side having the TFT substrate 51 faces toward a observer B, a phenomenon in which a first image for another observer A is mixed into a second image for the observer B does not occur. Furthermore, a phenomenon in which the second image for the observer B is mixed into the first image for the observer A does not occur. As a result, good visibility is provided for the both observers.

Since the circularly polarizing plate 56 is placed on the outer surface of the TFT substrate 51 of the liquid crystal panel 11, a phenomenon which light from the front light for observer A which is placed opposite to the TFT substrate 51's side of the liquid crystal panel is reflected by the signal wire 53 formed on the TFT substrate 51 is prevented from occurring, and good visibility is provided for the observer B facing toward the TFT substrate 51's side of the liquid crystal panel.

Embodiment 4

In above-mentioned embodiment 3, no $\lambda/2$ plate is inserted between the polarizing plate 59 and the $\lambda/4$ plate 58, and between the polarizing plate 67 and the $\lambda/4$ plate 66, as previously explained. As an alternative, a $\lambda/2$ plate can be inserted between the polarizing plate 59 and the $\lambda/4$ plate 58, and between the polarizing plate 67 and the $\lambda/4$ plate 66.

Each $\lambda/2$ plate is also a type of a plate, and is an optical film having a phase difference of about $\lambda/2$. Each combination of three plates: a polarizing plate, a $\lambda/2$ plate, and a $\lambda/4$ plate serves as a wide-band circularly polarizing plate.

In each combination, the $\lambda/2$ plate has a function of rotating the polarization direction of linearly polarized light passing through the polarizing plate by an angle which is twice the angle which the transmission axis of the polarizing plate forms with the slow axis of the $\lambda/2$ plate.

The linearly polarized light passing through the $\lambda/2$ plate becomes circularly-polarized light after passing the $\lambda/4$ plate, as in the case of above-mentioned embodiment 3. The addition of the $\lambda/2$ plate into each combination makes it for each combination to have a function of operating as a circularly polarizing plate in a wider range of wavelengths.

Figures 14, 15:
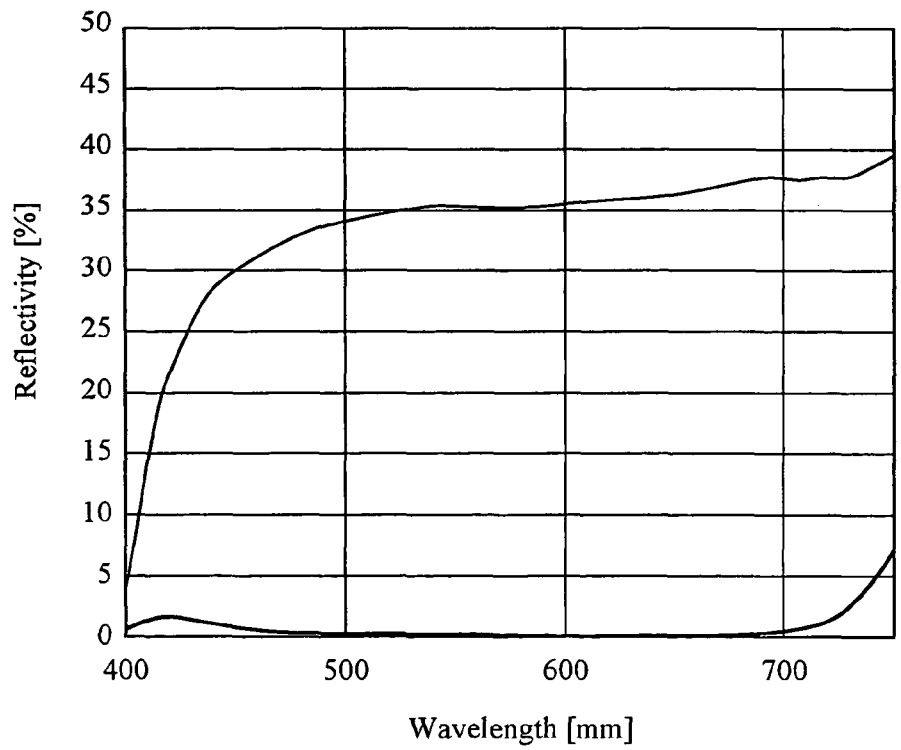
FIG. 14 is an explanatory diagram showing the details of the specifications of the optical films of the liquid crystal panel 11 of FIG. 9.
FIG. 15 is an explanatory diagram showing reflectance spectra of the circularly polarizing plate of the liquid crystal panel 11 of FIG. 9.

FIG. 14 is an explanatory diagram showing the details of the specifications of the optical films of the liquid crystal panel 11 of FIG. 9.

FIG. 15 is an explanatory diagram showing reflection spectra of the circularly polarizing plate of the liquid crystal panel 11 of FIG. 9. In the figure, a thick line shows a reflection spectrum in a case where all the optical films disposed on the TFT substrate 51 of this embodiment 3 are bonded to a glass substrate onto which an aluminum metallic film is vapor-deposited.

The reflectivity of the circularly polarizing plate is measured with respect to the reflectivity of a glass substrate with aluminum having no film. Compared with the reflectivity (shown by a thin line in the figure) of only a polarizing plate, the reflectivity of this embodiment is reduced in a wider range of wavelengths.

When the liquid crystal panel of FIG. 9 is placed so that its side having the TFT substrate 51 faces toward the observer B, a phenomenon in which a first image for an observer A is mixed into a second image for another observer B does not occur.

Furthermore, a phenomenon in which the second image for the observer B is mixed into the first image for the observer A does not occur. As a result, good visibility is provided for the both observers.

Since the circularly polarizing plate 56 is placed on the outer surface of the TFT substrate 51 of the liquid crystal panel 11, a phenomenon in which light from the front light for observer A which is placed opposite to the TFT substrate 51's side of the liquid crystal panel is reflected by the signal wire 53 disposed on the TFT substrate 51 is prevented from occurring, and good visibility is provided for the observer B facing toward the TFT substrate 51's side of the liquid crystal panel.

Embodiment 5

In either of above-mentioned embodiments 3 and 4, the liquid crystal layer 69 which constitutes the liquid crystal panel 11 has a bend alignment, as previously explained. As an alternative, the liquid crystal layer 69 can have an alignment similar to the bend alignment.

For example, when a voltage is applied to a liquid crystal layer having a twist alignment of about 180 degrees, the liquid crystal layer has a bend alignment into which a twist alignment is mixed.

Even in this case, the liquid crystal layer can exhibit high-speed response characteristics.

The optical films disposed in the liquid crystal panel 11 do not necessarily have the same structure as that in accordance with either of above-mentioned embodiments 3 and 4.

For example, a two-axis film having both an in-plane phase difference and a phase difference in the direction of the thickness thereof can be used, as optical films formed on the TFT substrate 51 in accordance with above-mentioned embodiment 3, instead of the $\lambda/4$ plate 58 and c plate 57. As an alternative, a combination of an a plate and a two-axis film, a combination of a two-axis film and a c plate, or two or more two-axis films can be used.

Similarly, a combination of one or more optical films including a two-axis film can be used, as optical films formed on the CF substrate 61, instead of the combination of either the $\lambda/4$ plate 66 and c plate 65, or the c plate 65 and a plate 64.

Also in above-mentioned embodiment 4, a combination of one or more optical films including a two-axis film can be used as optical films formed in the liquid crystal panel, as in the case of above-mentioned embodiment 3.

It is desirable that acid resisting processing is performed on the surfaces of the CF substrate 61 and TFT substrate 51 in order to reduce the reflection of light emitted out of each front light by the corresponding one of them.

Embodiment 6

In either of above-mentioned embodiments 3 and 4, the liquid crystal layer 69 which constitutes the liquid crystal panel 11 has a bend alignment, as previously explained. As an alternative, a liquid crystal layer which constitutes a liquid crystal panel 11 can have a substantially parallel alignment.

Figure 16:
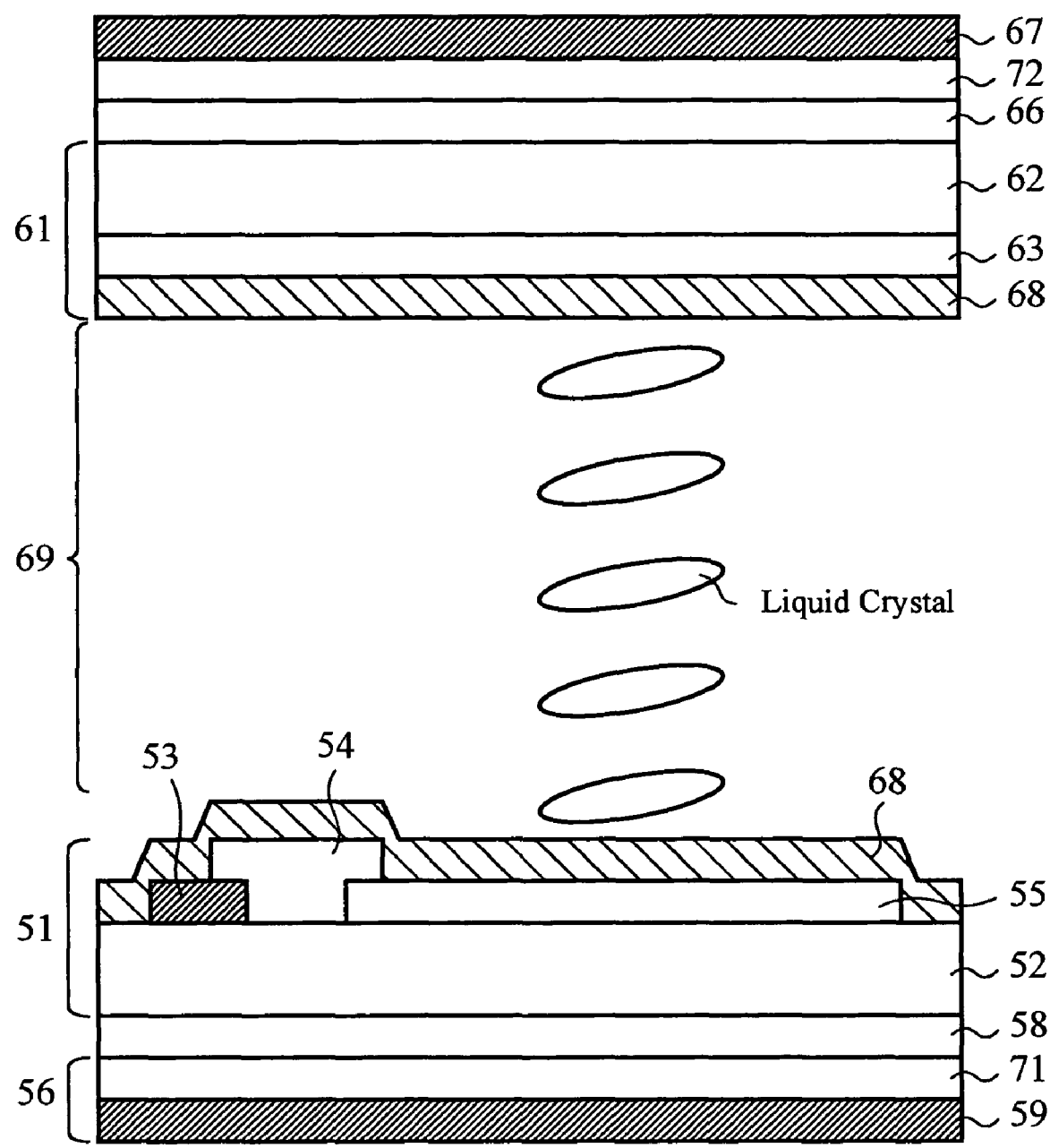
FIG. 16 is a cross-sectional view showing a liquid crystal panel 11 of a liquid crystal display in accordance with embodiment 6 of the present invention.

FIG. 16 is a cross-sectional view showing the liquid crystal panel 11 of the liquid crystal display in accordance with embodiment 6 of the present invention. In the figure, since the same reference numerals as shown in FIG. 9 denote the same components or like components, the explanation of the components will be omitted hereafter.

In the example of FIG. 16, a $\lambda/4$ plate 58 is placed instead of the c plate 57 of FIG. 9, and a circular polarizing plate 56 is provided with a $\lambda/2$ plate 71 instead of the $\lambda/4$ plate 58 of FIG. 9.

A λ/4 plate 66, a λ/2 plate 72, and a deflecting plate 67 are disposed on a CF substrate 61.

In the example of FIG. 16, a liquid crystal material is sandwiched by the CF substrate 61 and a TFT substrate 51 via alignment films 68 so that a fixed gap can be maintained between the CF substrate 61 and the TFT substrate 51, and the liquid crystal molecules are aligned in parallel between the upper and lower substrates.

Figures 17, 18:
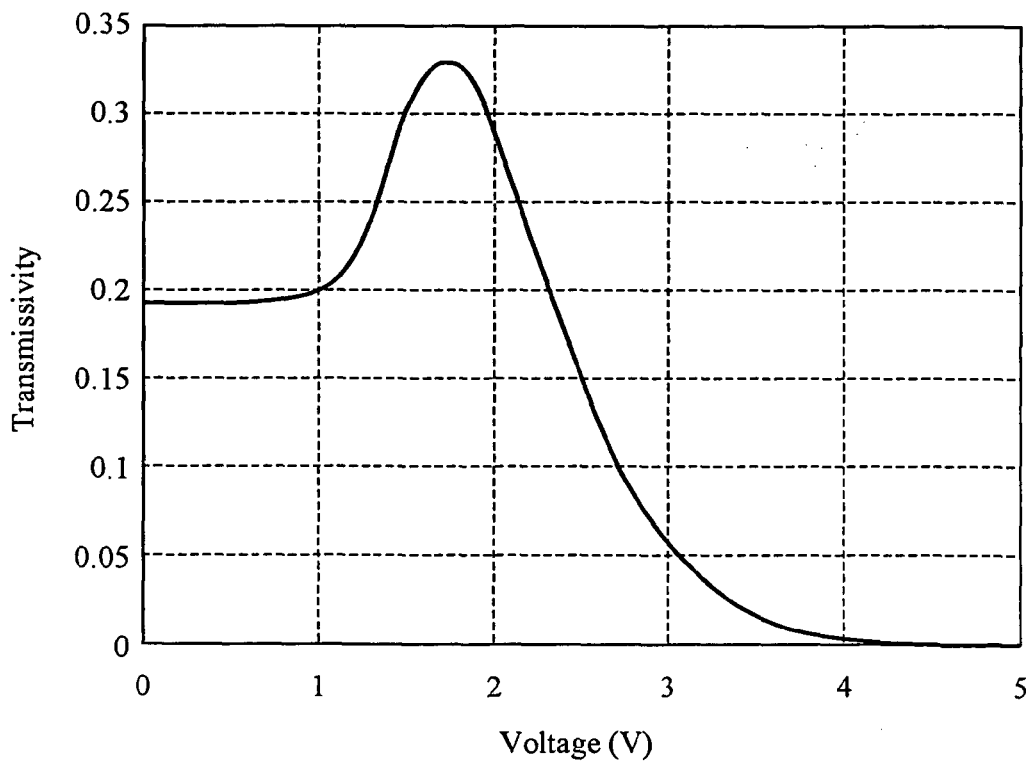
FIG. 17 is an explanatory diagram showing the details of the specifications of optical films of the liquid crystal panel 11 of FIG. 16.
FIG. 18 is an explanatory diagram showing the voltage-transmissivity characteristics of the liquid crystal panel 11 of FIG. 16.

Laminated films are bonded onto the outer surface of each of the CF substrate 61 and TFT substrate 51 (see FIG. 17).

In this embodiment 6, a rightward direction is defined as 0 degrees and a counterclockwise direction is defined as a positive direction, and each direction is expressed in degrees with respect to the rightward direction when viewed from the CF substrate 61's side of the liquid crystal panel.

In each polarizing plate, the direction of its transmission axis is expressed in degrees with respect to the rightward direction, and, in each λ/2 or λ/4 plate, the direction of its slow axis is expressed in degrees with respect to the rightward direction.

In this embodiment 6, a typical uniaxially oriented film can be used as each λ/2 or λ/4 plate if it has a predetermined birefringence value when viewed from a right angle with respect to the front thereof. When a hybrid film (e.g., an NR film) in which its optical characteristics vary along the direction of the thickness thereof is used as each λ/2 or λ/4 plate, it is also possible to expand the viewing angle. As an alternative, one of various types of retardation films can be used as each λ/2 or λ/4 plate according to the use of the liquid crystal display.

The liquid crystal material of the liquid crystal layer 69 of this embodiment 6 has refractive-index-anisotropy $\Delta n$ of 0.15 (at 589 nm and 25 degrees centigrade), and permittivity anisotropy $\Delta \epsilon$ of 7.6, and the liquid crystal layer 69 has a thickness (or panel gap) of 3 micrometers and a birefringence value of 450 nm.

Next, a specific operation of the liquid crystal panel 11 of FIG. 16 for providing a high speed response will be explained.

When a voltage is applied between a picture element electrode 55 and a counterelectrode 63 in the liquid crystal panel of FIG. 16, the transmissivity varies as shown in FIG. 18.

When a voltage for white display is about 1.9V and a voltage for black display is about 4.5V, a display of white and a display of black can be carried out using only the intermediate states of changes in the alignment of the liquid crystal molecules which are caused by changes in the applied voltage, and the amount of response of the liquid crystal molecules (i.e., angles which vary with the voltage of the liquid crystal alignment) can be reduced. Therefore, the liquid crystal panel can be made to respond at a high speed.

The liquid crystal panel in accordance with this embodiment 6 switches from a display of white to a display of back in a time of about 1 ms, and switches from a display of back to a display of white in a time of about 8 ms, and can respond at a speed several times as high as that in a normal TN mode or the like.

When the birefringence value of the liquid crystal layer 69 falls within a wavelength range of 350 nm to 550 nm, good display quality which is the same as that acquired when using the liquid crystal panel 11 of FIG. 2 can be provided.

When the birefringence value of the liquid crystal layer 69 is less than 350 nm, the amount of response of the liquid crystal molecules cannot be reduced and hence no display with a high speed response can be produced.

When the birefringence value of the liquid crystal layer 69 exceeds 550 nm, the display discolors yellow and hence the display quality degrades remarkably.

Therefore, it is desirable that the birefringence value of the liquid crystal layer 69 falls with a wavelength range of 350 nm to 550 nm in order to provide good display quality.

Simultaneously, it is desirable that the refractive index anisotropy of the liquid crystal material falls within a range of 0.1 to 0.2.

When the refractive index anisotropy of the liquid crystal material is less than 0.1, since a large change in the alignment is needed in order to provide a change in the birefringence of the liquid crystal layer 69 required for display by applying a voltage to the liquid crystal layer, a high speed response cannot be provided.

On the other hand, when the refractive index anisotropy of the liquid crystal material exceeds 0.2, since the birefringence value of the liquid crystal layer varies very rapidly because of the application of a voltage to the liquid crystal layer, the birefringence value which the liquid crystal layer 69 has when a voltage for black display or the like is applied thereto varies due to a variation in the applied voltage which is caused by individual variations of the liquid crystal panel 11 and therefore good display quality cannot be provided with stability and with good repeatability.

It is therefore desirable that the refractive index anisotropy of the liquid crystal material falls within a range of 0.1 to 0.2.

In accordance with this embodiment 6, light incident upon the TFT substrate 51's side of the liquid crystal panel passes through the polarizing plate 59 and so on and then reaches the TFT substrate 51, and almost all of the light is incident upon the liquid crystal layer 69 just as it is, while a part of the light is reflected by metallic films formed on the TFT substrate 51, such as a signal wire 53, and passes through the polarizing plate 59 and so on again and then emerges to outside the liquid crystal panel 11 from the lower side of the liquid crystal panel.

In a case where the liquid crystal panel 11 of the liquid crystal display can be observed from the TFT substrate 51's side thereof, since this reflected light reduces the display quality, it is preferable that the reflected light is reduced.

When only the polarizing plate 59 is formed on the outer surface of the TFT substrate 51, the reflectivity of the signal wire 53 and so on is about 30%.

Figures 19, 20:
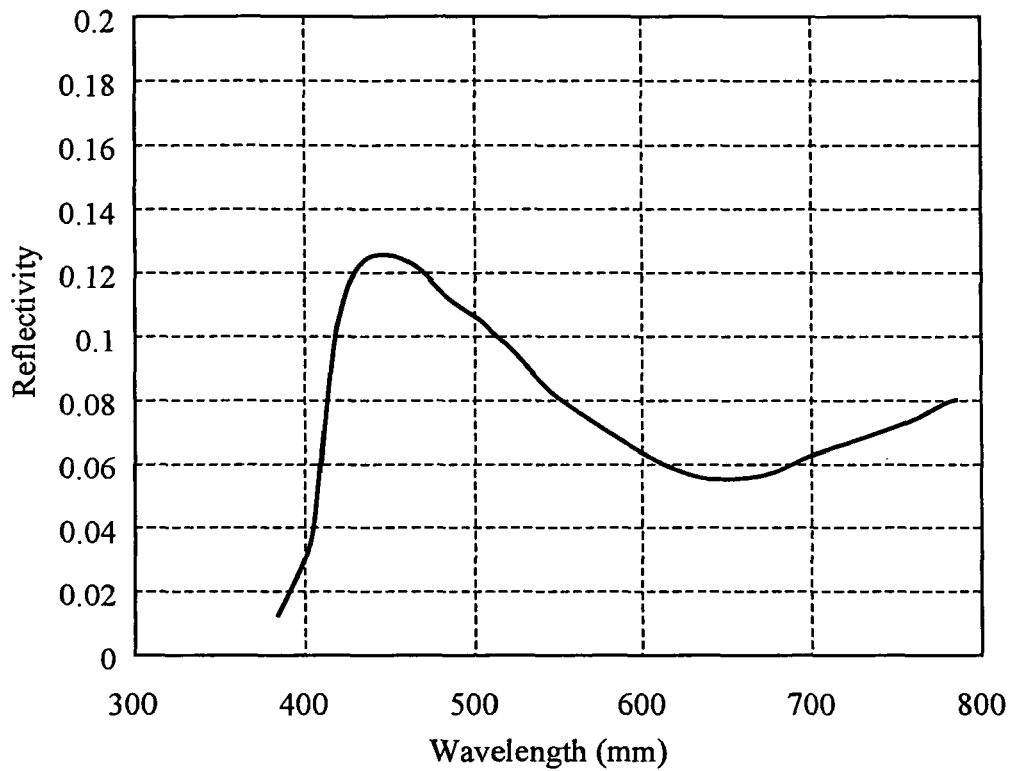
FIG. 19 is an explanatory diagram showing reflectance spectra of a circularly polarizing plate of the liquid crystal panel 11 of FIG. 16.
FIG. 20 is an explanatory diagram showing the details of the specifications of the optical films of the liquid crystal panel 11 of FIG. 16.

In contrast, in accordance with this embodiment 6, the reflectivity of the signal wire 53 can be reduced to about 10%, as shown in FIG. 19.

When the liquid crystal panel of FIG. 16 is placed so that its side having the TFT substrate 51 faces toward an observer B, a phenomenon in which a first image for another observer A is mixed into a second image for the observer B does not occur.

Furthermore, a phenomenon in which the second image for the observer B is mixed into the first image for the observer A does not occur. As a result, good visibility is provided for the both observers.

Since the circularly polarizing plate 56 is placed on the outer surface of the TFT substrate 51 of the liquid crystal panel 11, a phenomenon in which light from the front light for the observer A which is placed opposite to the TFT substrate 51's side of the liquid crystal panel is reflected by the signal wire 53 formed on the TFT substrate 51 is prevented from occurring, and good visibility is provided for the observer B facing toward the TFT substrate 51's side of the liquid crystal panel.

Furthermore, since the liquid crystal alignment of the liquid crystal panel 11 is parallel alignment, and the refractive index anisotropy of the liquid crystal material falls within a range of 0.1 to 0.2 and the birefringence value of the liquid crystal material falls within a range of 350 nm to 550 nm, the movements of the liquid crystal molecules at the time when providing either of a white display and a black display with an application of a voltage to the liquid crystal molecules can be reduced, and therefore responsibility of the order of several milliseconds can be provided.

Embodiment 7

In accordance with above-mentioned embodiment 6, the specifications of the optical films formed in the liquid crystal panel 11 are provided as shown in FIG. 17. As an alternative, the specifications of the optical films formed in the liquid crystal panel 11 can be provided as shown in FIG. 20.

In this embodiment 7, a typical uniaxially oriented film can be used as each $\lambda/2$ or $\lambda/4$ plate if it has a predetermined birefringence value when viewed from a right angle with respect to the front thereof. When a hybrid film (e.g., an NR film) in which its optical characteristics vary along the direction of the thickness thereof is used as each $\lambda/2$ or $\lambda/4$ plate, it is also possible to expand the viewing angle. As an alternative, one of various types of retardation films can be used as each $\lambda/2$ or $\lambda/4$ plate according to the use of the liquid crystal display.

The liquid crystal material of the liquid crystal layer of this embodiment 7 has refractive-index-anisotropy $\Delta n$ of 0.155 (at 589 nm and 25 degrees centigrade), and permittivity anisotropy $\Delta\epsilon$ of 7.9, and the liquid crystal layer has a thickness (or panel gap) of 3 micrometers, and a birefringence value of 465 nm.

In this embodiment 7, a screen display is produced with a voltage for white display being set to about 1.7V and a voltage for black display being set to about 4V.

The liquid crystal panel in accordance with this embodiment 7 switches from a display of white to a display of back in a time of about 1 ms, and switches from a display of back to a display of white in a time of about 7 ms, and can respond at a speed several times as high as that in a normal TN mode or the like.

In accordance with this embodiment 7, light incident upon the TFT substrate 51's side of the liquid crystal panel passes through the polarizing plate 59 and so on and then reaches the TFT substrate 51, and almost all of the light is incident upon the liquid crystal layer 69 just as it is, while a part of the light is reflected by metallic films formed on the TFT substrate 51, such as a signal wire 53, and passes through the polarizing plate 59 and so on again and then emerges to outside the liquid crystal panel 11 from the lower side of the liquid crystal panel.

In a case where the liquid crystal panel 11 of the liquid crystal display can be observed from the TFT substrate 51's side thereof, since this reflected light reduces the display quality, it is preferable that the reflected light is reduced.

When only the polarizing plate 59 is formed on the outer surface of the TFT substrate 51, the reflectivity of the signal wire 53 and so on is about 30%.

Figure 21:
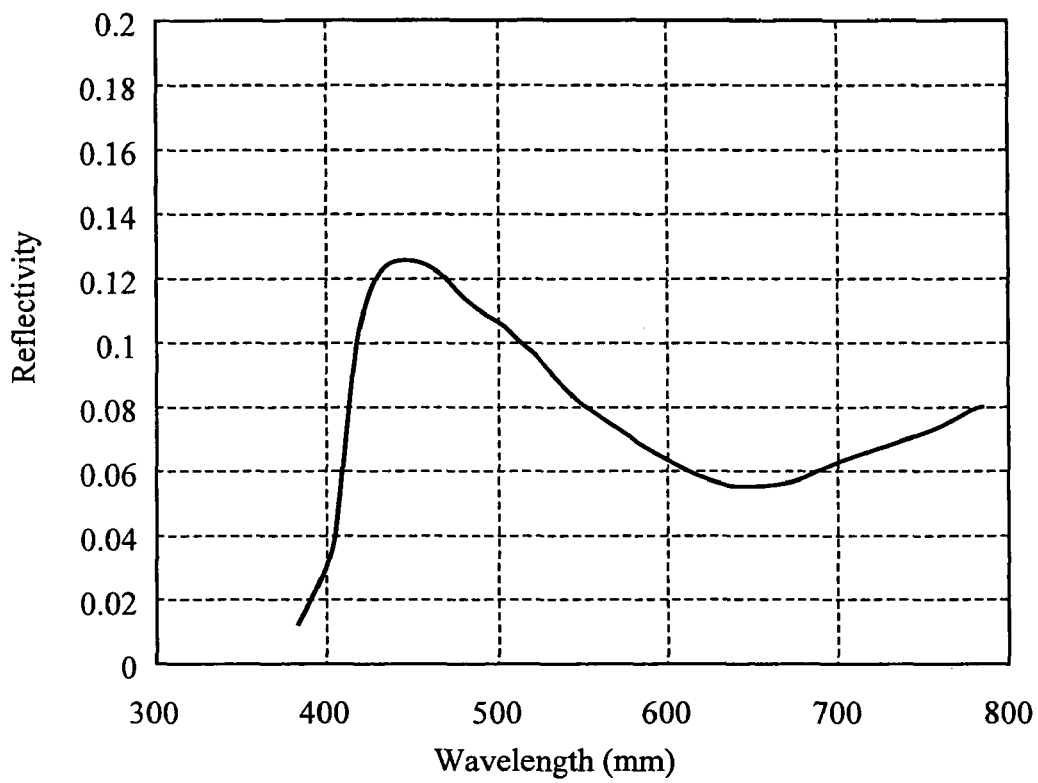
FIG. 21 is an explanatory diagram showing reflectance spectra of the circularly polarizing plate of the liquid crystal panel 11 of FIG. 16.

In contrast, in accordance with this embodiment 7, the reflectivity of the signal wire 53 can be reduced to about 10%, as shown in FIG. 21.

When the liquid crystal panel of FIG. 16 is placed so that its side having the TFT substrate 51 faces toward an observer B, a phenomenon in which a first image for another observer A is mixed into a second image for the observer B does not occur.

Furthermore, a phenomenon in which the second image for the observer B is mixed into the first image for the observer A does not occur. As a result, good visibility is provided for the both observers.

Since the circularly polarizing plate 56 is placed on the outer surface of the TFT substrate 51 of the liquid crystal panel 11, a phenomenon in which light from the front light for the observer A which is placed opposite to the TFT substrate 51's side of the liquid crystal panel is reflected by the signal wire 53 formed on the TFT substrate 51 is prevented from occurring, and good visibility is provided for the observer B facing toward the TFT substrate 51's side of the liquid crystal panel.

Embodiment 8

In any of above-mentioned embodiments 1 to 7, the direction in which light is emitted out of each of the front lights 12 and 13 is perpendicular to the liquid crystal panel 11, as previously mentioned. As an alternative, the direction in which light is emitted out of each of the front lights 12 and 13 can be inclined with respect to a direction perpendicular to the liquid crystal panel 11, and the direction in which light is emitted out of the front light 12 can differ from the direction in which light is emitted out of the front light 13, as shown in FIG. 22.

Figure 23:
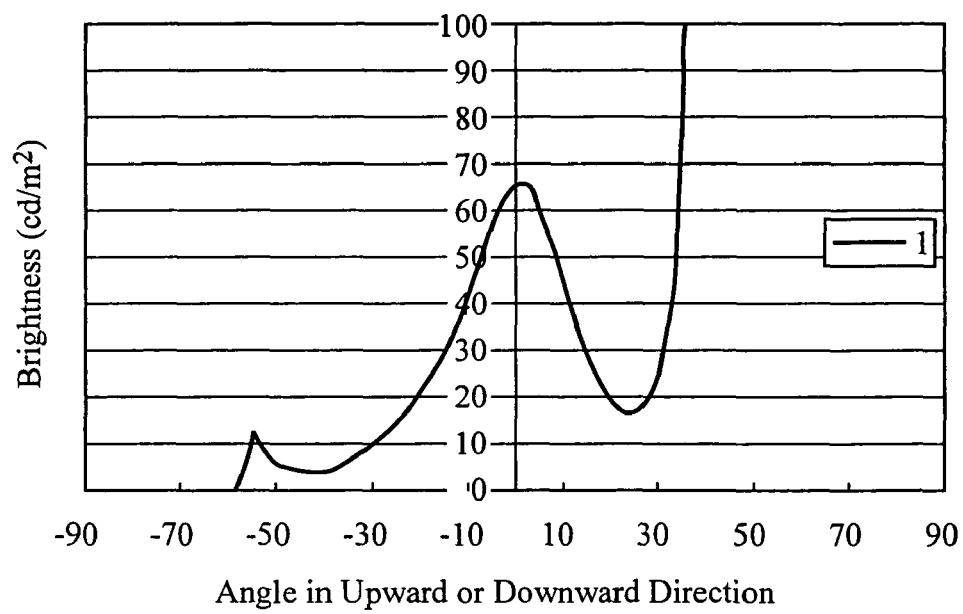
FIG. 23 is an explanatory diagram showing the brightness of a liquid crystal panel 11.

Each of the front lights 12 and 13 usually emits main light in a direction substantially perpendicular to the surfaces of the liquid crystal panel 11, as shown in FIG. 23. This is because the on-screen image is made to have the highest brightness when viewed from a right angle with respect to the front surface of the liquid crystal panel 11.

Figure 22:
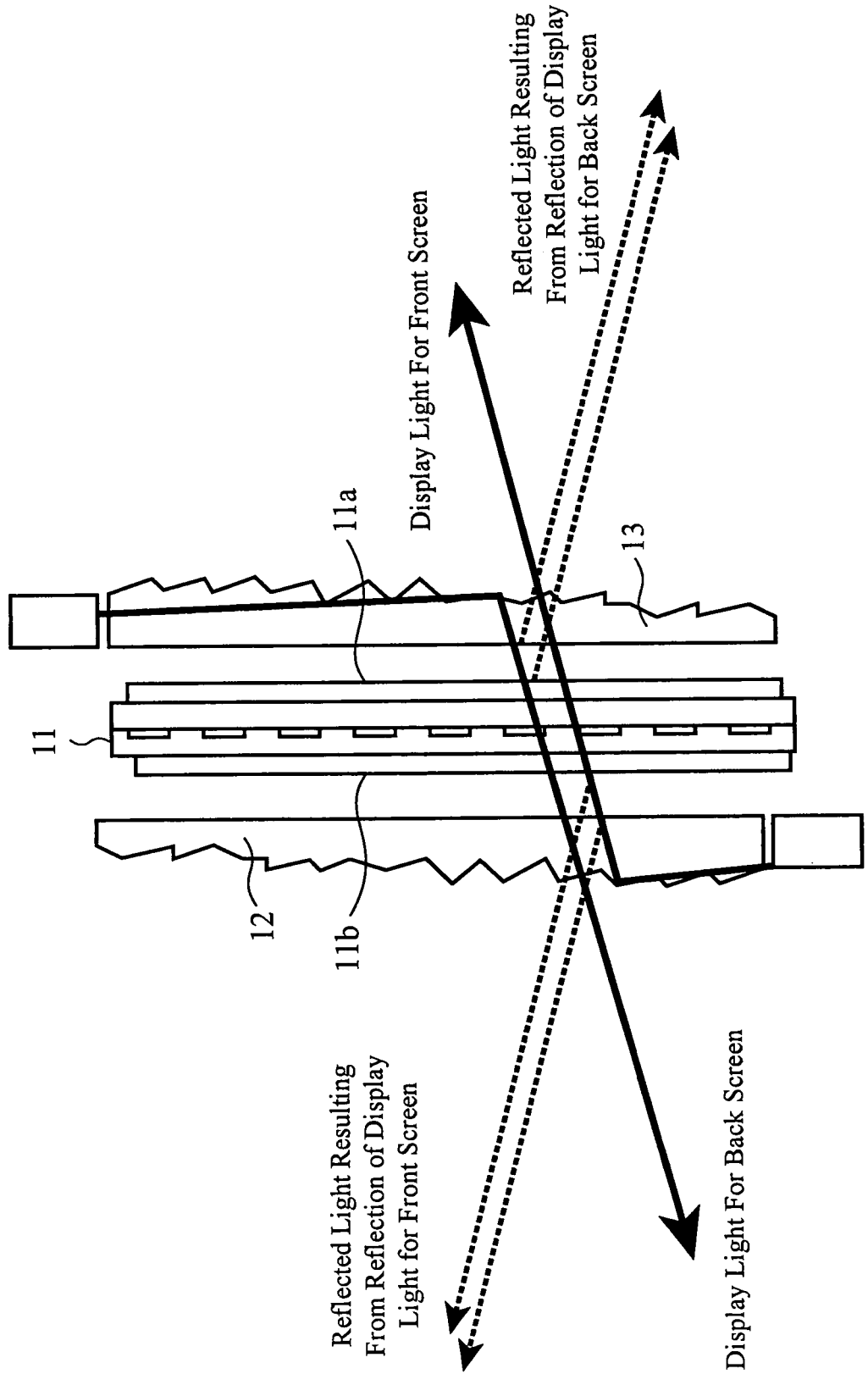
FIG. 22 is a cross-sectional view showing a liquid crystal display in accordance with embodiment 8 of the present invention.
Figure 24:
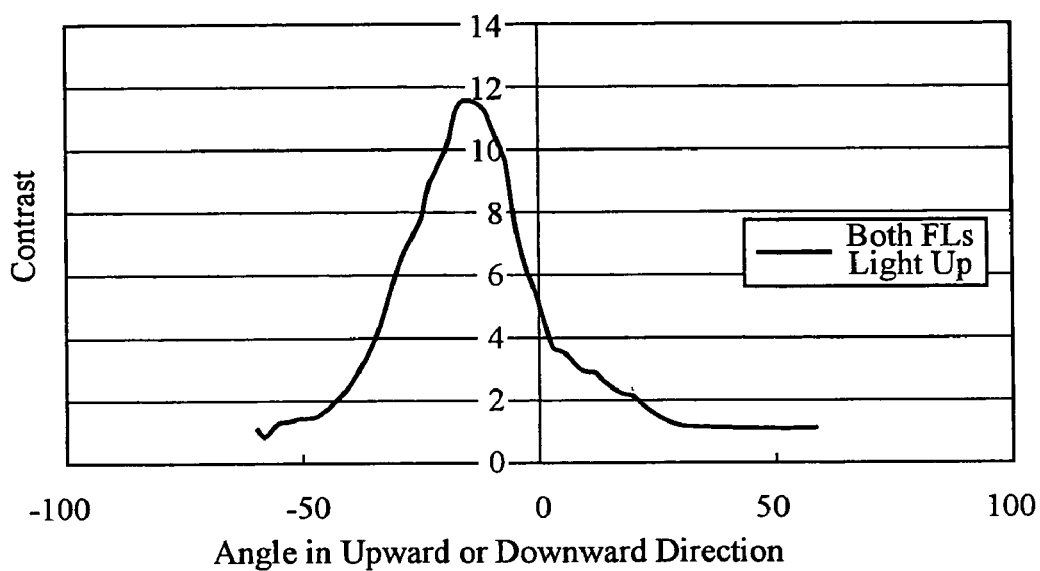
FIG. 24 is an explanatory diagram showing the contrast of the liquid crystal panel 11.

However, in a case where transparent backlights 12 and 13 are disposed on the front and back sides of the single liquid crystal panel 11, respectively, as shown in FIG. 22, and images are simultaneously displayed on the both sides of the liquid crystal panel by switching on the backlights 12 and 13, the contrast with respect to a perpendicular direction which maximizes the brightness may degrade, as shown in FIG. 24, when viewed from a right angle with respect to the front surface of the liquid crystal panel, which makes the on-screen image have the highest brightness, since a part of the light emitted out of the backlight for back screen is simultaneously reflected from the front surface of the liquid crystal panel 11 and the back surface of the backlight.

This embodiment 8 is aimed at improving the reduction in the contrast due to this reflected light. In this embodiment 8, the direction in which light is mainly emitted out of each of the backlights 12 and 13 is inclined toward a direction opposite to the direction of the light source of each of the backlights 12 and 12 by a certain angle of 5 to 10 degrees with respect to a direction perpendicular to the liquid crystal panel 11, and the direction in which light is mainly emitted out of the backlight 12 differs from the direction in which light is mainly emitted out of the backlight 13 by a certain angle of 10 to 20 degrees.

As a result, since the intensity of unnecessary reflected light (i.e., light which is emitted out of the backlight for back screen and is reflected by the front surface of the liquid crystal panel 11 and so on) which is incident in the direction in which the light emitted out of the backlight for front screen and passing through the liquid crystal panel 11 has the highest brightness is reduced, the reduction in the contrast due to the reflected light in an angle range of visibility which provides the highest brightness is suppressed, and a high-contrast, bright, and vivid screen display can be produced on the front screen.

The same goes for the quality of the image displayed on the back screen. That is, since the intensity of unnecessary reflected light (i.e., light which is emitted out of the backlight for front screen and is reflected by the back surface of the liquid crystal panel 11 and so on) which is incident in the direction in which the light emitted out of the backlight for back screen has the highest brightness is reduced, the reduction in the contrast due to the reflected light in an angle range of visibility which provides the highest brightness is suppressed, and a high-contrast, bright, and vivid screen display can be produced on the back screen.

Figure 27:
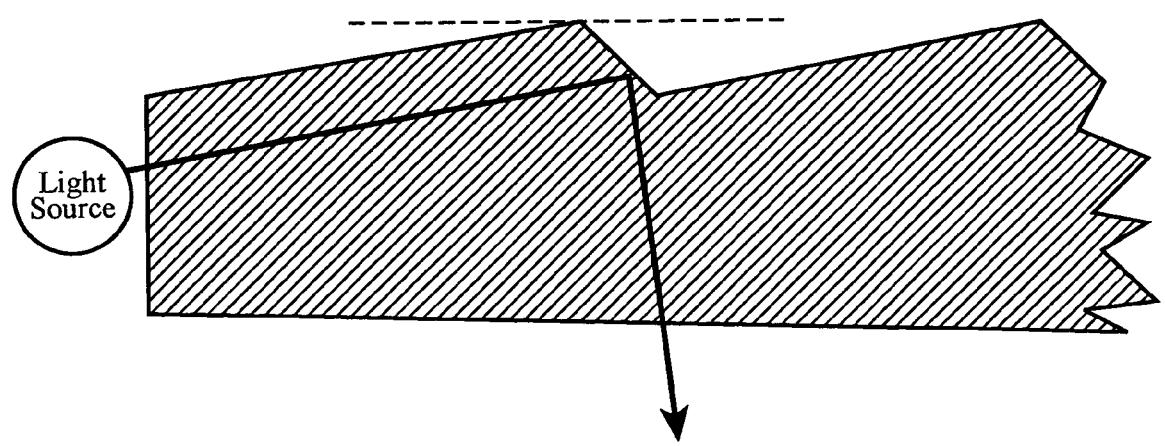
FIG. 27 is a cross-sectional view showing backlights 12 and 13 in each of which triangular reflecting prisms are formed.

As shown in FIG. 27, a triangle-shaped reflecting prism having a small angle of 0 to 5 degrees with respect to a direction of the light source and having an angle of 40 to 50 degrees with respect to a direction opposite to the direction of the light source is formed in a surface of a light guiding plate of each of the backlights 12 and 13, which is opposite to another surface facing the liquid crystal panel.

When the triangle-shaped reflecting prism is so formed as to have an angle of 40 to 43 degrees with respect to a direction opposite to the direction of the light source, light which is inclined by 4 degrees toward the opposite direction with respect to a side surface of the light guiding plate (i.e., the normal to the surfaces of the liquid crystal panel 11) is emitted. On the other hand, when the triangle-shaped reflecting prism is so formed as to have an angle of 47 to 50 degrees with respect to a direction opposite to the direction of the light source, light which is inclined by 4 degrees toward the direction of the light source with respect to the side surface of the light guiding plate is emitted. However, there is much light leaking to outside the light guiding plate from the surface in which the prism is formed, and therefore the efficiency is reduced.

Figure 25:
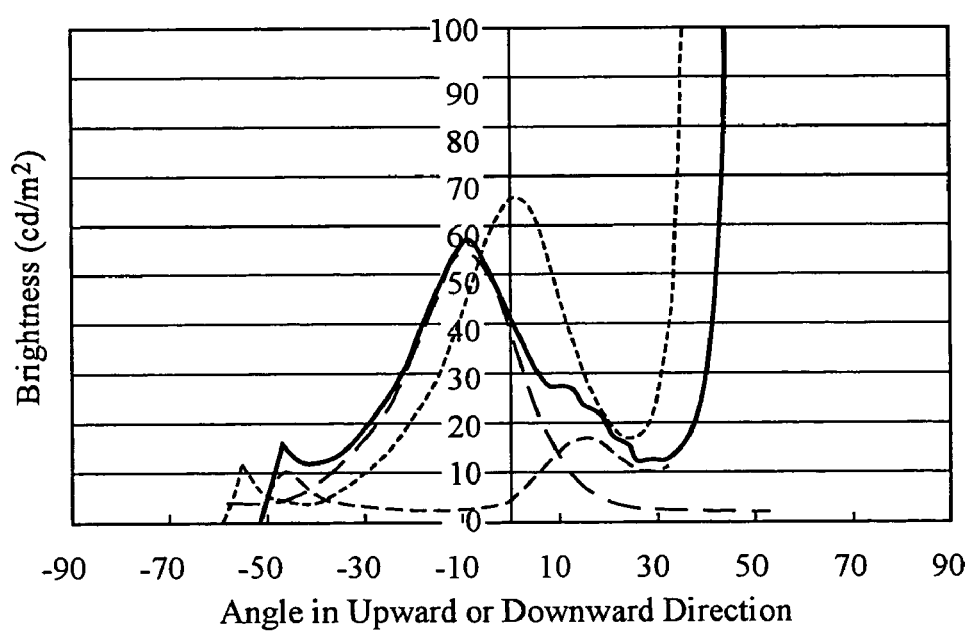
FIG. 25 is an explanatory diagram showing the brightness of the liquid crystal panel 11.

In the example of FIG. 25, the direction in which light is mainly emitted out of each of the backlights 12 and 13 is inclined toward a direction opposite to the direction of the light source of each of the backlights 12 and 12 by a certain angle of 8 degrees with respect to a direction perpendicular to the liquid crystal panel 11, and the direction in which light is mainly emitted out of the backlight 12 differs from the direction in which light is mainly emitted out of the backlight 13 by a certain angle of 16 degrees.

Figure 26:
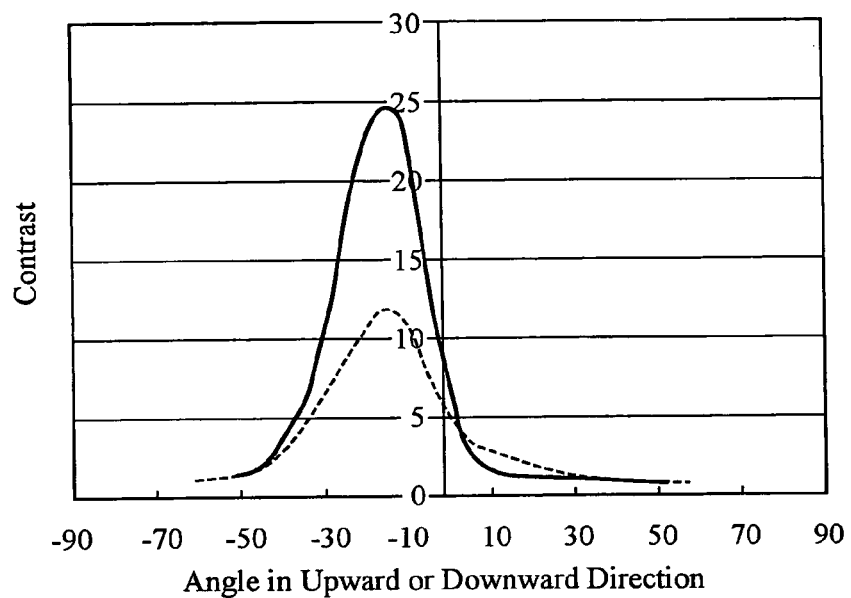
FIG. 26 is an explanatory diagram showing the contrast of the liquid crystal panel 11.

As a result, as shown in FIG. 26, the contrast at the time when viewed from an angle of 8 degrees which maximizes the brightness increases greatly (see the solid line) as compared with a case (see the dashed line) where the direction in which light is mainly emitted out of the backlight is a perpendicular direction.

When the liquid crystal display of this embodiment is mounted in a folding type mobile phone, since the main direction of visibility of a screen which becomes the back screen when the mobile phone is unfolded is oriented toward an upward direction in many cases, it is desirable that for the backlight for the back screen which is located inside when the mobile phone is unfolded, the triangle-shaped reflecting prism is so formed as to have an angle of 40 to 43 degrees with respect to a direction opposite to the direction of the light source and the light source is placed on the hinge's side of the mobile phone, and, for the other backlight for the inner screen which is located outside when the mobile phone is unfolded, the triangle-shaped reflecting prism is so formed as to have an angle of 40 to 43 degrees with respect to a direction opposite to the direction of the light source and the light source is placed on the other side of the mobile phone opposite to the hinge's side.

INDUSTRIAL APPLICABILITY

As mentioned above, the liquid crystal display in accordance with the present invention is suitable for use in information equipment, such as a mobile phone, a portable electronic notebook (PDA), or a wrist watch, which includes a liquid crystal panel having two screens and which needs to display an image different from another image currently being displayed on one screen on another screen.

The invention claimed is:

1. A liquid crystal display, comprising:
a liquid crystal panel having two screens;
a first front light placed in a vicinity of one of the two screens of said liquid crystal panel;
a second front light placed in a vicinity of the other one of the two screens of said liquid crystal panel;
a pixel driving circuit configured to drive pixels of said liquid crystal panel to display an image on said liquid crystal panel, wherein said pixel driving circuit alternately displays a first image and a second image on said liquid crystal panel,
said first front light lights up while the first image is displayed on said liquid crystal panel by said pixel driving circuit, and said second front light lights up while the second image is displayed on said liquid crystal panel by said pixel driving circuit, each of said first and second front lights is configured to light up repeatedly, thereby each of different images is simultaneously displayed on a front surface direction and a back surface direction of said liquid crystal panel;
a light source of said first front light and a light source of said second front light are disposed opposite to each other with respect to a direction along the screens of said liquid crystal panel; and
the direction in which light is mainly emitted out of each of the first and second front lights is inclined toward a direction opposite to a direction of the light source of each of the first and second front lights by an angle of 5 to 10 degrees with respect to the direction perpendicular to the liquid crystal panel, respectively.

2. Information equipment comprising:
a liquid crystal display, including
a liquid crystal panel having two screens,
a first front light placed in a vicinity of one of the two screens of said liquid crystal panel,
a second front light placed in a vicinity of the other one of the two screens of said liquid crystal panel,
a pixel driving circuit configured to drive pixels of said liquid crystal panel to display an image on said liquid crystal panel, wherein said pixel driving circuit alternately displays a first image and a second image on said liquid crystal panel,
said first front light lights up while the first image is displayed on said liquid crystal panel by said pixel driving circuit, and said second front light lights up while the second image is displayed on said liquid crystal panel by said pixel driving circuit, each of said first and second front lights is configured to light up repeatedly, thereby each of different images is simultaneously displayed on a front surface direction and a back surface direction of said liquid crystal panel,
a light source of said first front light and a light source of said second front light are disposed opposite to each other with respect to a direction along the screens of said liquid crystal panel, and
the direction in which light is mainly emitted out of each of the first and second front lights is inclined toward a direction opposite to a direction of the light source of each of the first and second front lights by an angle of 5 to 10 degrees with respect to the direction perpendicular to the liquid crystal panel, respectively.

* * * * *